United States Patent
Gomez et al.

(10) Patent No.: US 9,336,777 B2
(45) Date of Patent: May 10, 2016

(54) SPEECH PROCESSING DEVICE, SPEECH PROCESSING METHOD, AND SPEECH PROCESSING PROGRAM

(71) Applicant: HONDA MOTOR CO., LTD., Tokyo (JP)

(72) Inventors: Randy Gomez, Wako (JP); Kazuhiro Nakadai, Wako (JP); Keisuke Nakamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/446,581

(22) Filed: Jul. 30, 2014

(65) Prior Publication Data

US 2015/0066500 A1    Mar. 5, 2015

(30) Foreign Application Priority Data

Aug. 30, 2013  (JP) .................................. 2013-179196
May 9, 2014    (JP) .................................. 2014-097622

(51) Int. Cl.
*G10L 15/20* (2006.01)
*G10L 21/0208* (2013.01)

(52) U.S. Cl.
CPC ....... *G10L 15/20* (2013.01); *G10L 2021/02082* (2013.01)

(58) Field of Classification Search
CPC .................. G10L 15/20; G10L 2021/02082
USPC ............................................. 704/233–256.7
See application file for complete search history.

(56) References Cited

U.S. PATENT DOCUMENTS

| 7,716,044 | B2* | 5/2010 | Kobayashi | G10L 21/0364 704/205 |
| 8,271,277 | B2* | 9/2012 | Kinoshita | H04R 3/04 381/66 |
| 2007/0094024 | A1* | 4/2007 | Kristensson | G06F 3/0237 704/252 |
| 2011/0224979 | A1* | 9/2011 | Raux | G10L 15/07 704/233 |
| 2014/0037094 | A1* | 2/2014 | Ma | H04R 3/02 381/56 |

FOREIGN PATENT DOCUMENTS

JP    2011-065128 A    3/2011

* cited by examiner

*Primary Examiner* — Marcellus Augustin
(74) *Attorney, Agent, or Firm* — Squire Patton Boggs (US) LLP

(57) ABSTRACT

A speech processing device includes a speech recognition unit configured to sequentially recognize recognition segments from an input speech, a reverberation influence storage unit configured to store a degree of reverberation influence indicating an influence of a reverberation based on a preceding speech to a subsequent speech subsequent to the preceding speech and a recognition segment group including a plurality of recognition segments in correlation with each other, a reverberation influence selection unit configured to select the degree of reverberation influence corresponding to the recognition segment group which includes the plurality of recognition segments recognized by the speech recognition unit from the reverberation influence storage unit, and a reverberation reduction unit configured to remove a reverberation component weighted with the degree of reverberation influence from the speech from which at least a part of recognition segments of the recognition segment group is recognized.

7 Claims, 14 Drawing Sheets

| CLASS | POWER SPECTRAL DENSITY $D^{(c)}(\omega)$ | DEGREE OF REVERBERATION INFLUENCE $\tau^{(c)}$ |
|---|---|---|
| 1 | $D^{(1)}(\omega)$ | $\tau^{(1)}$ |
| 2 | $D^{(2)}(\omega)$ | $\tau^{(2)}$ |
| ... | ... | ... |
| C | $D^{(C)}(\omega)$ | $\tau^{(C)}$ |

| CLASS | POWER SPECTRAL DENSITY $D^{(c)}(\omega)$ | DEGREE OF REVERBERATION INFLUENCE $\tau^{(c)}$ |
|---|---|---|
| 1 | $D^{(1)}(\omega)$ | $\tau^{(1)}$ |
| 2 | $D^{(2)}(\omega)$ | $\tau^{(2)}$ |
| ... | ... | ... |
| C | $D^{(C)}(\omega)$ | $\tau^{(C)}$ |

FIG. 9

```
Sp1:   Hello, my friend and I went to a sushi bar yesterday and ordered
       Sweetfish.
       Can you give us information of that fish ?

Rb1:   Sweetfish is common in South East Asia. An edible fish known to
       its distinctive sweet flavor with melon and cucumber aromas.

Sp2:   We ate it with maki-sushi. Can you give me more information about
       maki-sushi ?

Rb2:   Maki-sushi is a rolled rice with other ingredients using a sheet
       of nori.
       There are many varieties of maki-sushi like chu-maki, futo-maki,
       temaki, uramaki among others.

Sp3:   Well, what is Tororo Kombu ?

Rb3:   Tororo Kombu is made from thinly sliced kombu with vinegar flavour
       and dried.
```

FIG. 10

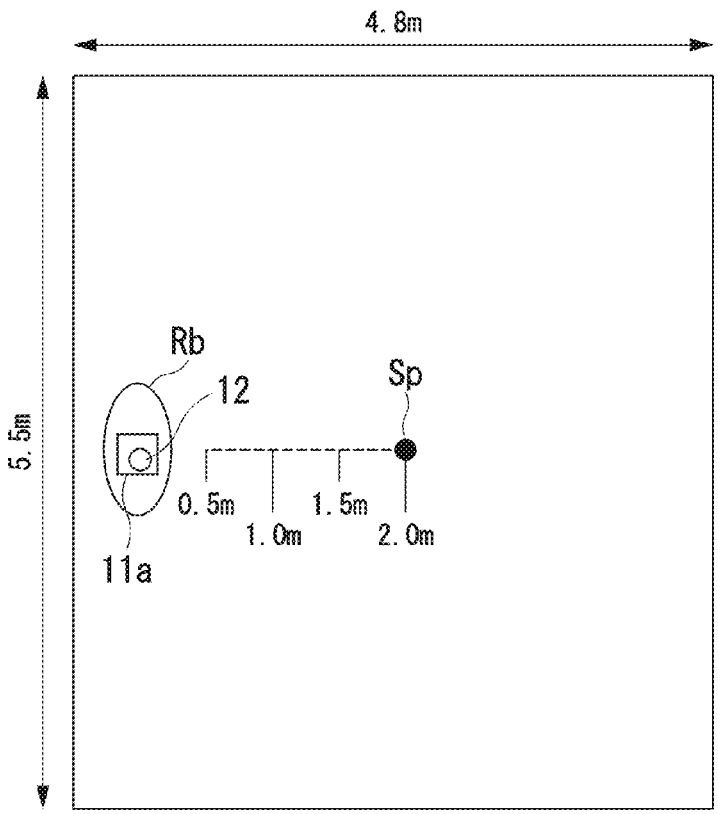

FIG. 11

| METHOD | 0.5m | 1.0m | 1.5m | 2.0m |
|---|---|---|---|---|
| (A) NO PROCESSING | 90.2 | 82.3 | 74.4 | 69.7 |
| (B) BLIND DEREVERBERATION | 90.6 | 81.4 | 77.3 | 72.6 |
| (C) WIENER FILTERING METHOD (RELATED ART) | 90.6 | 81.7 | 78.9 | 75.3 |
| (D) WIENER FILTERING METHOD (SECOND EMBODIMENT) | 91.2 | 82.9 | 80.2 | 77.9 |
| (E) SPECTRAL SUBTRACTION (RELATED ART) | 90.6 | 81.9 | 79.0 | 76.2 |
| (F) SPECTRAL SUBTRACTION (SECOND EMBODIMENT) | 91.8 | 83.8 | 82.9 | 78.7 |

FIG. 12

| METHOD | 0.5m | 1.0m | 1.5m | 2.0m |
|---|---|---|---|---|
| (A) NO PROCESSING | 81.2 | 70.3 | 54.5 | 41.7 |
| (B) BLIND DEREVERBERATION | 83.6 | 73.5 | 58.1 | 52.8 |
| (C) WIENER FILTERING METHOD (RELATED ART) | 84.9 | 76.9 | 60.1 | 55.2 |
| (D) WIENER FILTERING METHOD (SECOND EMBODIMENT) | 86.7 | 83.9 | 71.4 | 65.4 |
| (E) SPECTRAL SUBTRACTION (RELATED ART) | 85.9 | 78.6 | 62.3 | 57.1 |
| (F) SPECTRAL SUBTRACTION (SECOND EMBODIMENT) | 87.5 | 84.5 | 73.4 | 68.3 |

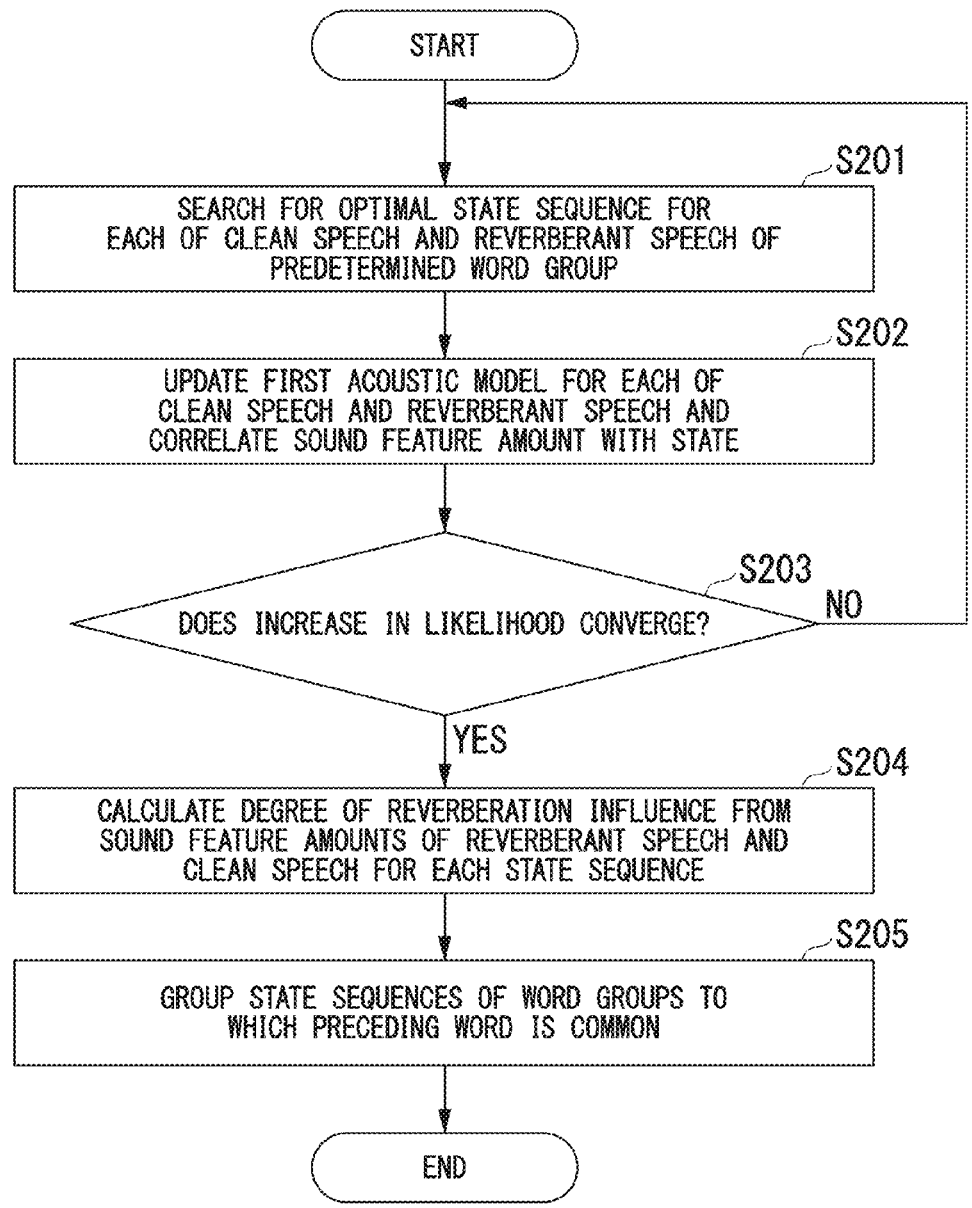

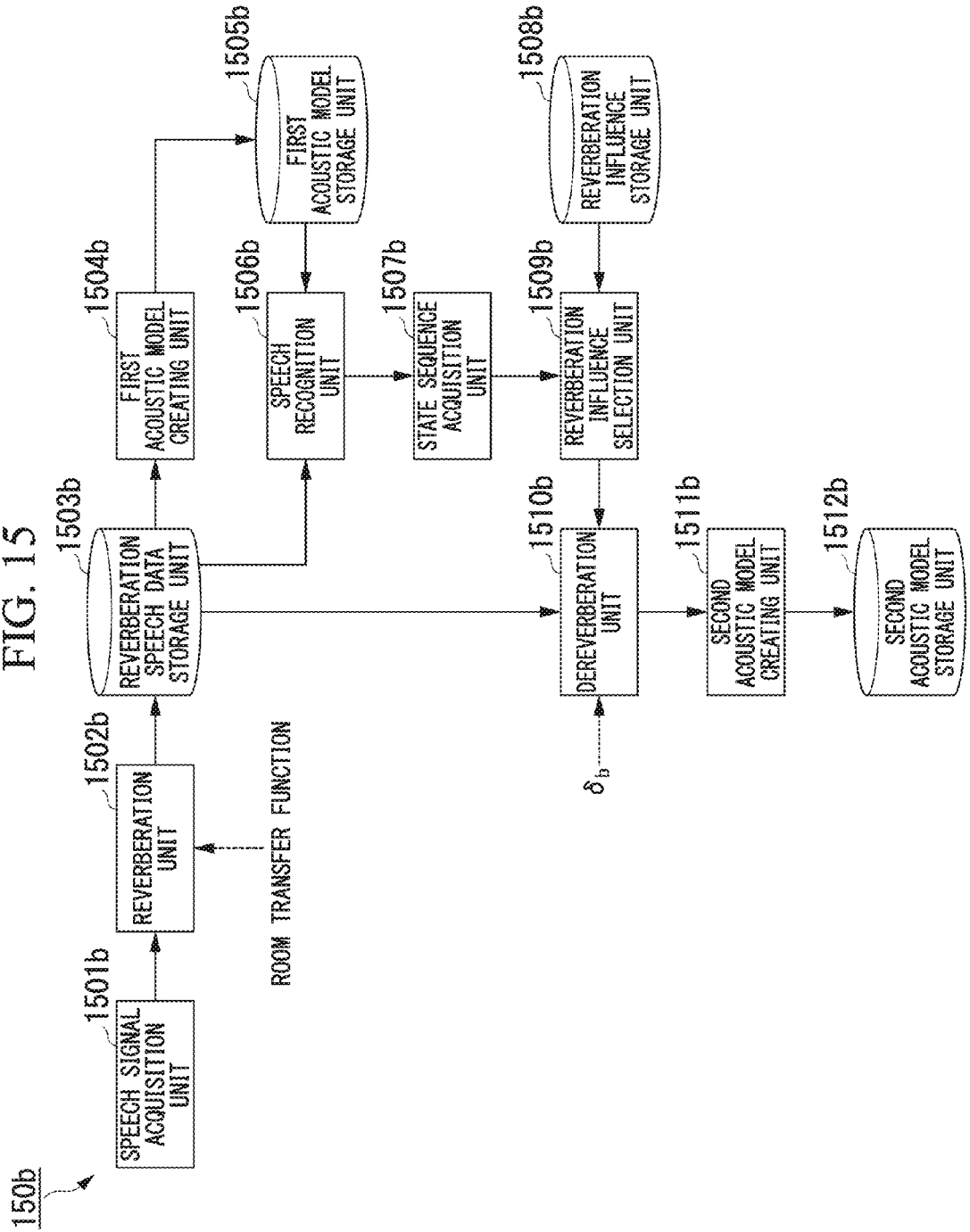

SPEECH PROCESSING DEVICE, SPEECH PROCESSING METHOD, AND SPEECH PROCESSING PROGRAM

CROSS REFERENCE TO RELATED APPLICATIONS

Priority is claimed on Japanese Patent Application No. 2013-179196, filed on Aug. 30, 2013, and Japanese Patent Application No. 2014-097622, filed on May 9, 2014, the contents of which are entirely incorporated herein by reference.

BACKGROUND OF THE INVENTION

1. Field of the Invention

The present invention relates to a speech processing device, a speech processing method, and a speech processing program.

2. Description of Related Art

A sound emitted in a room is repeatedly reflected by walls or installed objects to cause reverberations. In speeches recorded in a room, reverberations based on previously-uttered speech are added to currently-uttered speech. When the recorded speeches are subjected to a speech recognizing process, the speech recognition rate thereof may be lower than that of the original speech. Therefore, reverberation reducing techniques of removing reverberation components from speeches recorded in reverberation environments have been developed.

For example, Japanese Unexamined Patent Application, First Publication No. 2011-065128 (Patent Document 1) describes a reverberation removing device including weighting coefficient creating means for estimating the ratio of energy of a sound output from a sound source prior to an observation point of time with respect to the observed energy of a sound based on a given reverberation time, power spectrum storage means for storing the energy of a sound output prior to the observation point of time, and reverberation component subtracting means for subtracting the energy, which is output prior to the observation point of time and stored in the power spectrum storage means, from the energy of the observed sound, by using a weighting coefficient. In the technique described in Patent Document 1, only reverberation components are subtracted from the observed energy of a sound.

In general, an uttered speech has different sound energy depending on words; however, the technique described in Patent Document 1 estimates sound energy based on the reverberation time and does not consider differences between words. Accordingly, since all the energy based on reverberations cannot be removed from the currently-observed sound energy, it may not be possible to satisfactorily improve speech recognition accuracy.

SUMMARY OF THE INVENTION

The present invention is made in consideration of the above-mentioned circumstances and provides a speech processing device, a speech processing method, and a speech processing program which can reduce the influence of reverberations to improve speech recognition accuracy.

(1) In order to solve the above-mentioned problems, according to an aspect of the present invention, a speech processing device is provided including: a speech recognition unit configured to sequentially recognize recognition segments from an input speech; a reverberation influence storage unit configured to store a degree of reverberation influence indicating an influence of a reverberation based on a preceding speech to a subsequent speech subsequent to the preceding speech and a recognition segment group including a plurality of recognition segments in correlation with each other; a reverberation influence selection unit configured to select the degree of reverberation influence corresponding to the recognition segment group which includes the plurality of recognition segments recognized by the speech recognition unit from the reverberation influence storage unit; and a reverberation reduction unit configured to remove a reverberation component weighted with the degree of reverberation influence from the speech from which at least a part of recognition segments of the recognition segment group is recognized.

(2) As another aspect of the present invention, in the speech processing device according to (1), the reverberation reduction unit may be configured to calculate a first reverberation component by multiplying the speech from which the at least a part of recognition segments is recognized by a dereverberation parameter indicating a contribution of a reverberation component, to calculate a second reverberation component by weighting the first reverberation component with the degree of reverberation influence, and to remove the second reverberation component from the speech from which the at least a part of recognition segments is recognized.

(3) As another aspect of present invention, in the speech processing device according to (1) or (2), the recognition segment may be a word.

(4) As another aspect of the present invention, in the speech processing device according to (3), the recognition segment group may be a word pair including two neighboring words, and the degree of reverberation influence may be a parameter indicating a degree of influence of a reverberation based on a speech from which one word is recognized to a speech of a subsequent word.

(5) As another aspect of the present invention, in the speech processing device according to (4), the degree of reverberation influence may be the ratio of a power spectral density of a reverberation component based on the speech of the subsequent word with respect to a power spectral density of the speech of the one word, the reverberation influence storage unit may be configured to store the degree of reverberation influence and the power spectral density of a speech based on a word pair including the one word and the subsequent word in correlation with each other, and the reverberation influence selection unit may be configured to select the degree of reverberation influence corresponding to the power spectral density most approximate to the power spectral density of the input speech for each word pair from the words recognized by the speech recognition unit.

(6) As another aspect of the present invention, in the speech processing device according to (1) or (2), the recognition segment may be a state of utterance.

(7) As another aspect of the present invention, in the speech processing device according to (6), the recognition segment group may be a state sequence including a plurality of neighboring states, and the degree of reverberation influence may be the ratio of the power of a reverberation based on a speech from which a predetermined state sequence is recognized with respect to the power of the speech.

(8) As another aspect of the present invention, in the speech processing device according to (6) or (7), the speech recognition unit may be configured to recognize the states of utterance with reference to an acoustic model which is created so that a likelihood of a state sequence recognized from a speech from which a predetermined word group is uttered increases.

(9) According to another aspect of the present invention, a speech processing method is provided including: a speech recognizing step of sequentially recognizing recognition segments from an input speech; a reverberation influence selecting step of selecting a degree of reverberation influence corresponding to a recognition segment group, which includes a plurality of recognition segments recognized in the speech recognizing step, from a reverberation influence storage unit configured to store the degree of reverberation influence indicating an influence of a reverberation based on a preceding speech to a subsequent speech subsequent to the preceding speech and the recognition segment group including the plurality of recognition segments in correlation with each other; and a reverberation reducing step of removing a reverberation component weighted with the degree of reverberation influence from the speech from which at least a part of recognition segments of the recognition segment group is recognized.

(10) According to another aspect of the present invention, a non-transitory computer-readable storage medium is provided including a speech processing program causing a computer of a speech processing device to perform: a speech recognizing procedure of sequentially recognizing recognition segments from an input speech; a reverberation influence selecting procedure of selecting a degree of reverberation influence corresponding to a recognition segment group, which includes a plurality of recognition segments recognized in the speech recognizing procedure, from a reverberation influence storage unit configured to store the degree of reverberation influence indicating an influence of a reverberation based on a preceding speech to a subsequent speech subsequent to the preceding speech and the recognition segment group including the plurality of recognition segments in correlation with each other; and a reverberation reducing procedure of removing a reverberation component weighted with the degree of reverberation influence from the speech from which at least a part of recognition segments of the recognition segment group is recognized.

According to the configuration of (1), (9), or (10), a reverberation component weighted with the degree of reverberation influence indicating an influence of a reverberation based on a preceding speech to a subsequent speech is reduced from a speech from which at least a part of recognition segments of the recognition segment group is recognized. Accordingly, since reverberation reduction is performed in consideration of the influence of reverberations which are different between the recognition segments, it is possible to improve speech recognition accuracy in a speech recognizing process which is performed on a speech recorded with reverberations.

According to the configuration of (2), since the influence of the reverberation component obtained by multiplying the speech from which at least a part of recognition segments is recognized by the dereverberation parameter is removed in consideration of the influence of reverberations which are different between the recognition segments, it is possible to further improve speech recognition accuracy.

According to the configuration of (3), since the reverberation reduction is performed in consideration of the influence of a reverberation different between the words, it is possible to improve speech recognition accuracy in a speech recognizing process which is performed on a speech recorded with reverberations.

According to the configuration of (4), since the reverberation reduction based on the degree of reverberation influence can be performed for every two neighboring word pairs, it is possible to suppress an excessive increase in processing load.

According to the configuration of (5), since the degree of reverberation influence is selected based on the power spectral density of a speech and the reverberation reduction is performed using the selected degree of reverberation influence, a variation in frequency characteristics of a speech which is different between words is considered. Accordingly, it is possible to further improve speech recognition accuracy.

According to the configuration of (6), since the reverberation reduction is performed in consideration of the influence of a reverberation which is different between the states of utterance, it is possible to improve speech recognition accuracy in a speech recognizing process which is performed on a speech recorded with reverberations.

According to the configuration of (7), since the reverberation reduction is performed in consideration of the influence of power of a reverberation which is different in neighboring state sequences, it is possible to improve speech recognition accuracy in a speech recognizing process which is performed on a speech recorded with reverberations.

According to the configuration of (8), since the state of utterance is correlated with a sound feature amount indicating a physical feature of a speech in an acoustic model, the variation in physical feature of the speech is expressed by the state sequence. Accordingly, since the reverberation reduction is performed in consideration of the influence of power of a reverberation varying with the variation in physical features of a speech based on the state of utterance, it is possible to improve speech recognition accuracy in a speech recognizing process which is performed on a speech recorded with reverberations.

BRIEF DESCRIPTION OF THE DRAWINGS

FIG. 9 is a diagram showing an example of response data.

FIG. 10 is a plan view showing an arrangement example of a speaker and a sound collection unit in a test room.

FIG. 11 is a diagram showing an example of a speech recognition rate by processing methods.

FIG. 12 is a diagram showing another example of a speech recognition rate by processing methods.

FIG. 14 is a flowchart showing a data generating process.

FIG. 15 is a block diagram showing an acoustic model creating process.

DETAILED DESCRIPTION OF THE INVENTION

First Embodiment

Hereinafter, a first embodiment of the present invention will be described with reference to the accompanying drawings.

Figure 1:
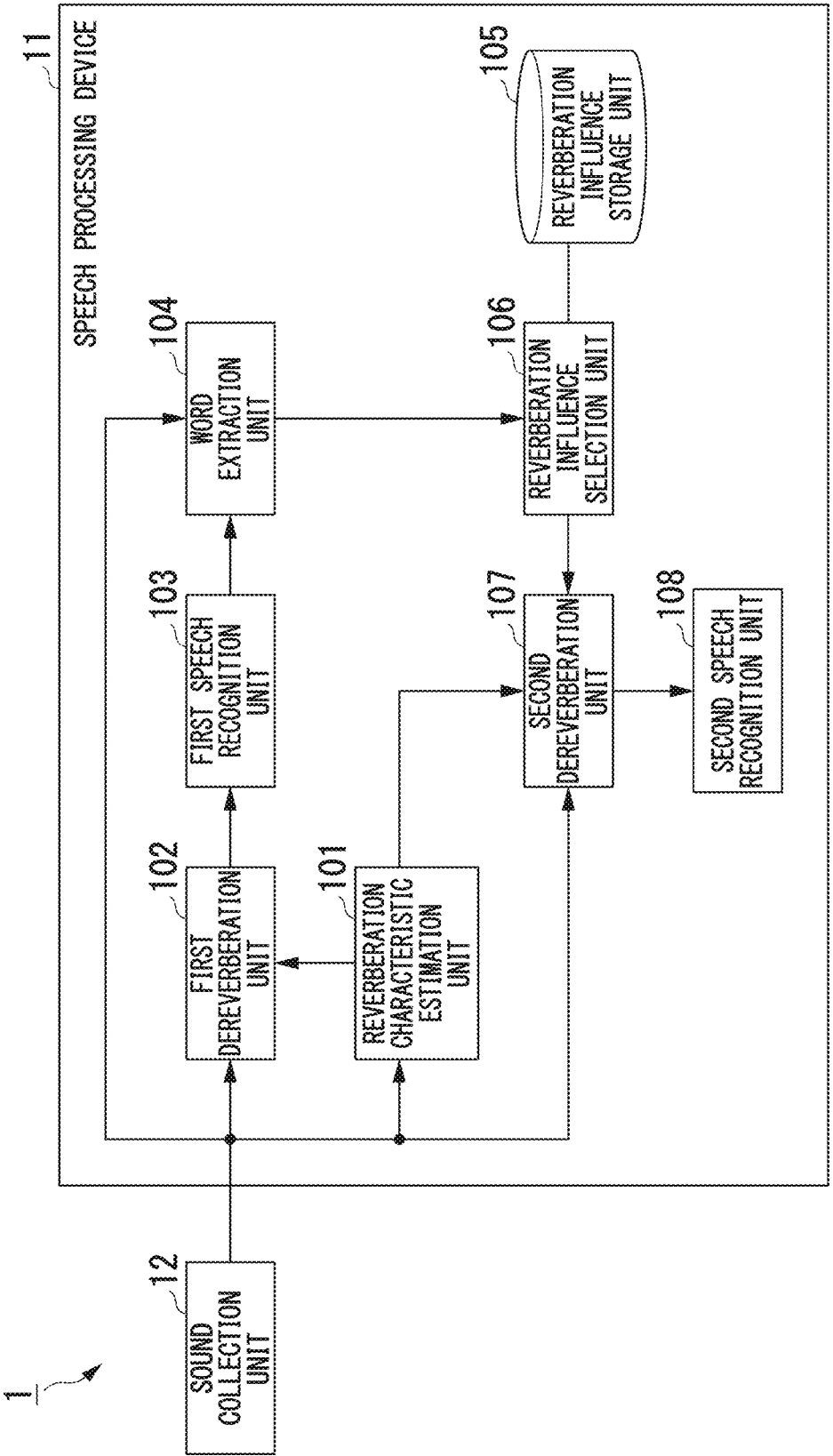
FIG. 1 is a block diagram showing a configuration of a speech processing system according to a first embodiment of the present invention.

FIG. 1 is a block diagram showing a configuration of a speech processing system 1 according to the first embodiment of the present invention.

The speech processing system 1 includes a speech processing device 11 and a sound collection unit 12.

The speech processing device 11 sequentially recognizes uttered words based on a speech signal input from the sound collection unit 12 and selects a degree of reverberation influence indicating an influence of a reverberation based on a speech of at least one word out of the recognized words to a speech of a subsequent word, as will be described later. Then, the speech processing device 11 removes a reverberation component weighted with the selected degree of reverberation influence from the speech of the at least one word.

The sound collection unit 12 records speech signals of M (where M is an integer greater than 0) channels and transmits the recorded speech signals to the speech processing device 11. The sound collection unit 12 may transmit the recorded speech signals in a wireless manner or in a wired manner.

When M is greater than 1, the speech signals only have to be synchronized with each other among the channels at the time of transmission. The sound collection unit 12 may be fixed or may be installed in a moving object such as a vehicle, an aircraft, or a robot so as to be movable. The sound collection unit 12 may be incorporated into the speech processing device 11 or may be provided as an independent body.

Here, a reverberation is a phenomenon in which a sound arrives even after a sound source stops issuing of a sound. The reverberation occurs by repeatedly reflecting a sound wave from a wall or an installed object. In general, since a direct sound directly arriving from a sound source overlaps with a reflection, the sound collection unit 12 records a reverberant speech. A part of the reflection in which the time elapsing after the direct sound is uttered is shorter than a predetermined time (for example, equal to or less than about 30 ms), the number of reflection times is relatively small, and reflection patterns thereof are distinguished is referred to as an early reflection. A part of the reflection in which the elapsed time is longer, the number of reflection times is large, and the reflection patterns thereof cannot be distinguished is referred to as a late reflection. The late reflection may be referred to as a late reverberation or simply a reverberation.

When a reverberation occurs, a reverberation based on a previously-uttered speech overlaps with a currently-uttered speech. Accordingly, the speech recognition rate of the reverberant speech is lower than that of a speech to which a reverberation is not added. A reverberation lowers intelligibility for speech details in terms of a human sense of hearing. In the below description, such an adverse influence of the reverberation is referred to as a reverberation influence (smearing). A speech to which a reverberation is added, a speech from which a reverberation is removed, and a speech in which a reverberation component is negligibly small are referred to as a reverberant speech, a dereverberated speech, and a clean speech, respectively. The reverberation influence may be referred to as a contamination.

The configuration of the speech processing device 11 will be described below.

The speech processing device 11 includes a reverberation characteristic estimation unit 101, a first dereverberation unit 102, a first speech recognition unit 103, a word extraction unit 104, a reverberation influence storage unit 105, a reverberation influence selection unit 106, a second dereverberation unit 107, and a second speech recognition unit 108.

The reverberation characteristic estimation unit 101 estimates a characteristic of a reverberation (reverberation characteristic) overlapping with a speech signal input from the sound collection unit 12. The reverberation characteristic estimation unit 101 estimates, for example, a dereverberation parameter $\delta_b$ for every predetermined frequency band b as an index indicating the reverberation characteristic. Here, the value of b is an integer between 1 and B, and B is an integer greater than 1 and indicates the number of predetermined frequency bands. The dereverberation parameter $\delta_b$ is an index indicating a ratio of the power of the late reflection with respect to the power of the reverberant speech. The reverberation characteristic estimation unit 101 outputs the estimated dereverberation parameter $\delta_b$ to the first dereverberation unit 102 and the second dereverberation unit 107.

The configuration of the reverberation characteristic estimation unit 101 will be described later.

The first dereverberation unit 102 removes a reverberation component from the speech signal input from the sound collection unit 12 based on the dereverberation parameter $\delta_b$ input from the reverberation characteristic estimation unit 101. The first dereverberation unit 102 outputs a dereverberated speech signal from which the reverberation component is removed to the first speech recognition unit 103. Here, the first dereverberation unit 102 calculates a frequency-domain coefficient $e(\omega, m)$ of the dereverberated speech based on the calculated frequency-domain coefficient $r(\omega, m)$ and the dereverberation parameter $\delta_b$, for example, using Expression (1).

$$|e(\omega,m)|^2 = |r(\omega,m)|^2 - \delta_b|r(\omega,m)|^2 (|r(\omega,m)|^2 - \delta_b|r(\omega,m)|^2 > 0)$$

$$|e(\omega,m)|^2 = \beta|r(\omega,m)|^2 \text{ (Otherwise)} \quad (1)$$

In Expression (1), |...| represents the absolute value of ... and $r(\omega, m)$ represents the frequency-domain coefficient in the m-th frame of the input speech signal. The late reflection component is removed from the power of the speech signal by the process indicated by the upper part of Expression (1). In the lower part of Expression (1), β represents a flooring coefficient. β is a predetermined positive small value (for example, 0.05) closer to 0 than 1. In this manner, by providing the term of $\oplus|r(\omega, m)|^2$, the minimum amplitude of the dereverberated speech signal is maintained and thus nonlinear noise such as musical noise is not generated well. The first dereverberation unit 102 generates a dereverberated speech signal by transforming the calculated frequency-domain coefficient $e(\omega, m)$ to the time domain, and outputs the generated dereverberated speech signal to the first speech recognition unit 103.

In the below description, the dereverberated speech signal generated by the first dereverberation unit 102 is referred to as a first dereverberated speech signal so as to be distinguished from a second dereverberated speech signal generated by the second dereverberation unit 107 to be described later.

The first speech recognition unit 103 performs a speech recognizing process on the first dereverberated speech signal input from the first dereverberation unit 102 to recognize speech details (for example, a text, that is, a word string, indicating a sentence), and outputs recognition data indicating the recognized speech details to the word extraction unit 104.

Here, the first speech recognition unit 103 calculates a sound feature amount of the first dereverberated speech signal at each predetermined time interval (for example, 10 ms). The sound feature amount is a set of a static Mel-scale log spectrum (static MSLS), a delta MSLS, and one piece of delta power.

The first speech recognition unit 103 recognizes phonemes using an acoustic model λ preset for the calculated sound feature amount. The acoustic model λ is, for example, a continuous hidden Markov model (HMM). The continuous HMM is a model in which an output distribution density is a continuous function, and the output distribution density is weighted with a plurality of normal distributions as a base. The acoustic model λ may be subjected to learning using clean speeches so as to provide the maximum likelihood.

The first speech recognition unit 103 recognizes a sentence indicating speech details using a language model preset for a phoneme sequence including recognized phonemes (continuous speech recognition). The recognized sentence is generally a word string including a plurality of words. The language model is a statistical model used to recognize a word or a sentence from a phoneme sequence. The first speech recognition unit 103 generates recognition data indicating the recognized word string and outputs the generated recognition data to the word extraction unit 104.

In the below description, the recognition data generated by the first speech recognition unit 103 is referred to as first recognition data so as to be distinguished from second recognition data generated by the second speech recognition unit 108 to be described later.

The word extraction unit 104 sequentially extracts word groups including predetermined N neighboring words (where N is an integer greater than 1, for example, 2) from the word string indicated by the first recognition data input from the first speech recognition unit 103. Here, "sequentially" means that a leading word formed by the extracted word groups is sequentially replaced with a subsequent word. The word extraction unit 104 extracts a speech signal of a section corresponding to a word group extracted from the speech signal input from the sound collection unit 12. The word extraction unit 104 outputs the extracted word group and the speech signal of the section corresponding to the word group to the reverberation influence selection unit 106. In the below description, it is mainly assumed that a word group is a word pair including two neighboring words. The relationship between the word string and the word pair will be described later. In the below description, a speech signal of a section corresponding to a word group is referred to as a "word group-section speech signal" and a speech signal of a section corresponding to a word pair is referred to as a "word pair-section speech signal".

Reverberation influence data is stored in advance in the reverberation influence storage unit 105. The reverberation influence data is data in which the intensity of a speech signal of a section from which a word pair including one word and a subsequent word is recognized and the degree of reverberation influence indicating a degree of influence of a reverberation based on a speech of one word to a speech of the subsequent word are correlated with each other. An index indicating the intensity is, for example, a power spectral density (PSD).

An example of the reverberation influence data or the process of calculating the degree of reverberation influence will be described later.

A word pair and a word pair-section speech signal are input to the reverberation influence selection unit 106 from the word extraction unit 104. The reverberation influence selection unit 106 calculates the intensity of the word pair-section speech signal and selects the degree of reverberation influence corresponding to the intensity, of which the temporal variation of the frequency characteristic is most approximate to the calculated intensity, from the reverberation influence storage unit 105. The reverberation influence selection unit 106 calculates, for example, similarity sim expressed by Expression (2) as an index indicating the degree of approximation.

$$\text{sim} = \langle D^{(c)*}(\omega), D_{tj}(\omega) \rangle \quad (2)$$

In Expression (2), $\langle D^{(c)*}(\omega), D_{tj}(\omega) \rangle$ represents cross-correlation between $D^{(c)}(\omega)$ and $D_{tj}(\omega)$. $D^{(c)}(\omega)$ represents a power spectral density of a word pair speech signal of a word pair of class c, which is stored in the reverberation influence storage unit 105. Class c is an index for identifying the word pair as described later. * represents a complex conjugate. $D_{tj}(\omega)$ represents the power spectral density of the word pair-section speech signal of a word pair $t_j$.

Therefore, $D^{(c)}(\omega)$ and $D_{tj}(\omega)$ are more approximate to each other as the similarity sim becomes larger, and $D^{(c)}(\omega)$ and $D_{tj}(\omega)$ are less approximate to each other as the similarity sim becomes smaller.

Here, the reverberation influence selection unit 106 calculates the power spectral density $D_{tj}(\omega)$, for example, using Expression (3).

$$D_{tj}(\omega) = \frac{1}{M_{tj}} \sum_{m=0}^{M_{tj}-1} P_r(\omega, m) \quad (3)$$

In Expression (3), $M_{tj}$ represents the number of frames of a section in which the word pair $t_j$ is recognized. $P_r(\omega, m)$ is a periodogram of a word pair-section speech signal (reverberant speech signal) in the m-th frame, that is, a square value of amplitude of components of the frequency ω. Accordingly, the power spectral density $D_{tj}(\omega)$ is an average value of the square values of the component of the frequency ω in the section in which the word pair $t_j$ is recognized.

The reverberation influence selection unit 106 outputs the selected degree of reverberation influence and the word pair input from the word extraction unit 104 to the second dereverberation unit 107.

In this manner, the reverberation influence selection unit 106 selects the degree of reverberation influence based on the intensity of the word pair-section speech signal corresponding to the word pair including the recognized words. Accordingly, the degree of reverberation influence corresponding to the characteristic is selected using the characteristic of the intensity of the reverberant speech signal including the reverberation component without using the information on words recognized in reverberation environments.

The second dereverberation unit 107 extracts a speech signal of a section corresponding to the word pair input from the word extraction unit 104 in the speech signal input from the sound collection unit 12 as a word pair-section speech signal.

The second dereverberation unit 107 removes the reverberation component from the extracted word pair-section speech signal based on the dereverberation parameter $\delta_b$, input from the reverberation characteristic estimation unit 101 and the degree of reverberation influence input from the reverberation influence selection unit 106. Here, the second dereverberation unit 107 calculates the reverberation component using the word pair-section speech signal and the dereverberation parameter $\delta_b$, and weights the calculated reverberation component with the degree of reverberation influence. The second dereverberation unit 107 removes the weighted reverberation component from the extracted word pair-section speech signal and generates a second dereverberated speech signal.

The second dereverberation unit 107 calculates the frequency-domain coefficient of the second dereverberated speech signal based on the frequency-domain coefficient of the word pair-section speech signal, the dereverberation parameter $\delta_b$, and the degree of reverberation influence, for example, using Expression (4).

$$|e(\omega,m,w_j)|^2 = |r(\omega,m,w_j)|^2 - \tau_j \delta_b |r(\omega,m,w_j)|^2 \, (|r(\omega,m,w_j)|^2 - \tau_j \delta_b |r(\omega,m,w_j)|^2 > 0)$$

$$|e(\omega,m,w_j)|^2 = \beta |r(\omega,m,w_j)|^2 \text{ (Otherwise)} \quad (4)$$

In Expression (4), $e(\omega, m, w_j)$ represents the frequency-domain coefficient in the m-th frame of the section in which a word $w_j$ is recognized in the second dereverberated speech signal. $r(\omega, m, w_j)$ represents the frequency-domain coefficient in the m-th frame of the section in which the word $w_j$ is recognized in the input speech signal. $\tau_j$ represents the degree of reverberation influence on the speech signal of the section in which the word pair $t_j$ including a word $w_j$ and a subsequent word $w_{j+1}$ is recognized. That is, the second term of the right side in the upper part of Expression (4) represents that the square value of the reverberation component is estimated by multiplying the square value of the frequency-domain coefficient $r(\omega, m, w_j)$ of the word pair-section speech signal in the m-th frame of the section in which the word $w_j$ is recognized by the dereverberation parameter $\delta_b$, and the estimated square value of the reverberation component is weighted with the degree of reverberation influence $\tau_j$. Accordingly, Expression (4) represents that the square value of the reverberation component weighted with the degree of reverberation influence $\tau_j$ is subtracted from the square value of the frequency-domain coefficient $r(\omega, m, w_j)$ of the word pair-section speech signal in the frame thereof and the frequency-domain coefficient $e(\omega, m, w_j)$ of the second dereverberated speech signal of the frame is determined.

As described in the lower part of Expression (4), the term of $\beta |r(\omega, m, w_j)|^2$ is provided to make it difficult to cause abnormal noise by maintaining the minimum amplitude in the second dereverberated speech signal similarly to Expression (1). The second dereverberation unit 107 generates the second dereverberated speech signal, which is obtained by transforming the calculated frequency-domain coefficient $e(\omega, m, w_j)$ to the time domain, and outputs the generated second dereverberated speech signal to the second speech recognition unit 108.

The second speech recognition unit 108 recognizes speech details by performing a speech recognizing process on the second dereverberated speech signal input from the second dereverberation unit 107, and outputs second recognition data indicating the recognized speech details to the outside of the speech processing device 11.

The second speech recognition unit 108 may have the same configuration as the first speech recognition unit 103. That is, the second speech recognition unit 108 calculates a sound feature amount of the second dereverberated speech signal for every predetermined time interval and recognizes phonemes using an acoustic model preset for the calculated sound feature amount. The second speech recognition unit 108 sequentially recognizes a sentence indicating the speech details using a language model preset for the phoneme sequence including the recognized phonemes, generates the second recognition data indicating the recognized word string, and outputs the generated second recognition data.

The second speech recognition unit 108 performs the speech recognizing process on the second dereverberated speech signal from which the reverberation component weighted with the degree of reverberation influence selected by the reverberation influence selection unit 106 is removed. The degree of reverberation influence is a parameter indicating a degree of influence of a reverberation based on a speech of one word to the speech of a subsequent word and thus a speech signal in which the reverberation component of the speech signal of the section in which the preceding word is recognized is reduced is used, thereby improving the speech recognition rate.

The reverberation influence selection unit 106 may output the word pair-section speech signal to the second dereverberation unit 107 in addition to the selected degree of reverberation influence and the word pair input from the word extraction unit 104. In this case, the second dereverberation unit 107 removes the reverberation component from the word pair-section speech signal input from the reverberation influence selection unit 106 based on the dereverberation parameter $\delta_b$ input from the reverberation characteristic estimation unit 101 and the degree of reverberation influence input from the reverberation influence selection unit 106. Here, the second dereverberation unit 107 calculates the reverberation component using the input word pair-section speech signal and the dereverberation parameter $\delta_b$, and weights the calculated reverberation component with the degree of reverberation influence. The second dereverberation unit 107 removes the weighted reverberation component from the extracted word pair-section speech signal to generate the second dereverberated speech signal. In this case, since the second speech recognition unit 108 uses the speech signal in which the reverberation component of the speech signal of the section in which the preceding word is recognized is reduced, it is possible to improve the speech recognition rate.

Example of Word String and Word Pair

An example of a word string indicated by the first recognition data input to the word extraction unit 104 and a word pair extracted by the word extraction unit 104 will be described below.

Figure 2:
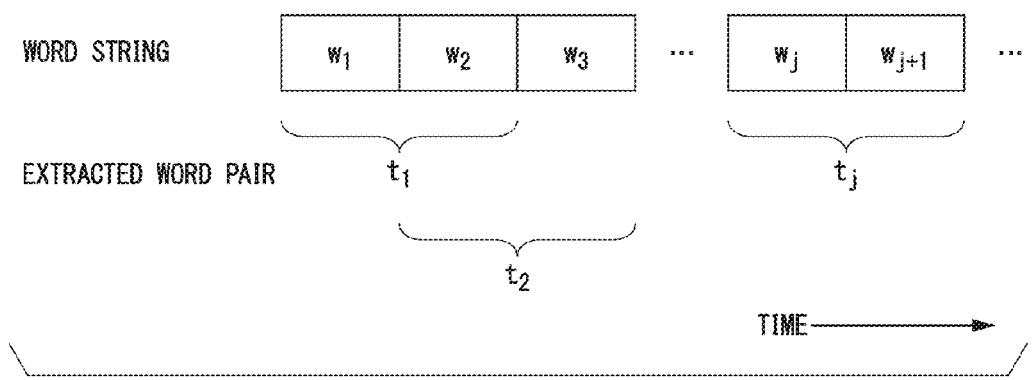
FIG. 2 is a diagram showing an example of a word sequence and a word pair.

FIG. 2 is a diagram showing an example of a word string and a word pair.

The upper part of FIG. 2 shows a word string including recognized words $w_1, w_2, w_3, \ldots, w_j, w_{j+1}, \ldots$. The lower part of FIG. 2 shows extracted word pairs $t_1, t_2, \ldots, t_j, \ldots$. In FIG. 2, the right-left direction represents the time. That is, a word or a word pair on the right side represents a later word or word pair than on the left side.

Here, the word pair $t_1$ includes words $w_1$ and $w_2$ extracted from the word string, the word pair $t_2$ includes words $w_2$ and $w_3$, and the word pair $t_j$ includes words $w_j$ and $w_{j+1}$. In this manner, the word extraction unit 104 repeatedly performs the process of extracting a word $w_j$ and a subsequent word $w_{j+1}$ subsequent thereto from the word string and generating a word pair $t_j$ whenever a word $w_{j+1}$ is input.

Example of Intensity of Speech Signal

An example of the intensity of a speech signal will be described below.

Figure 3:
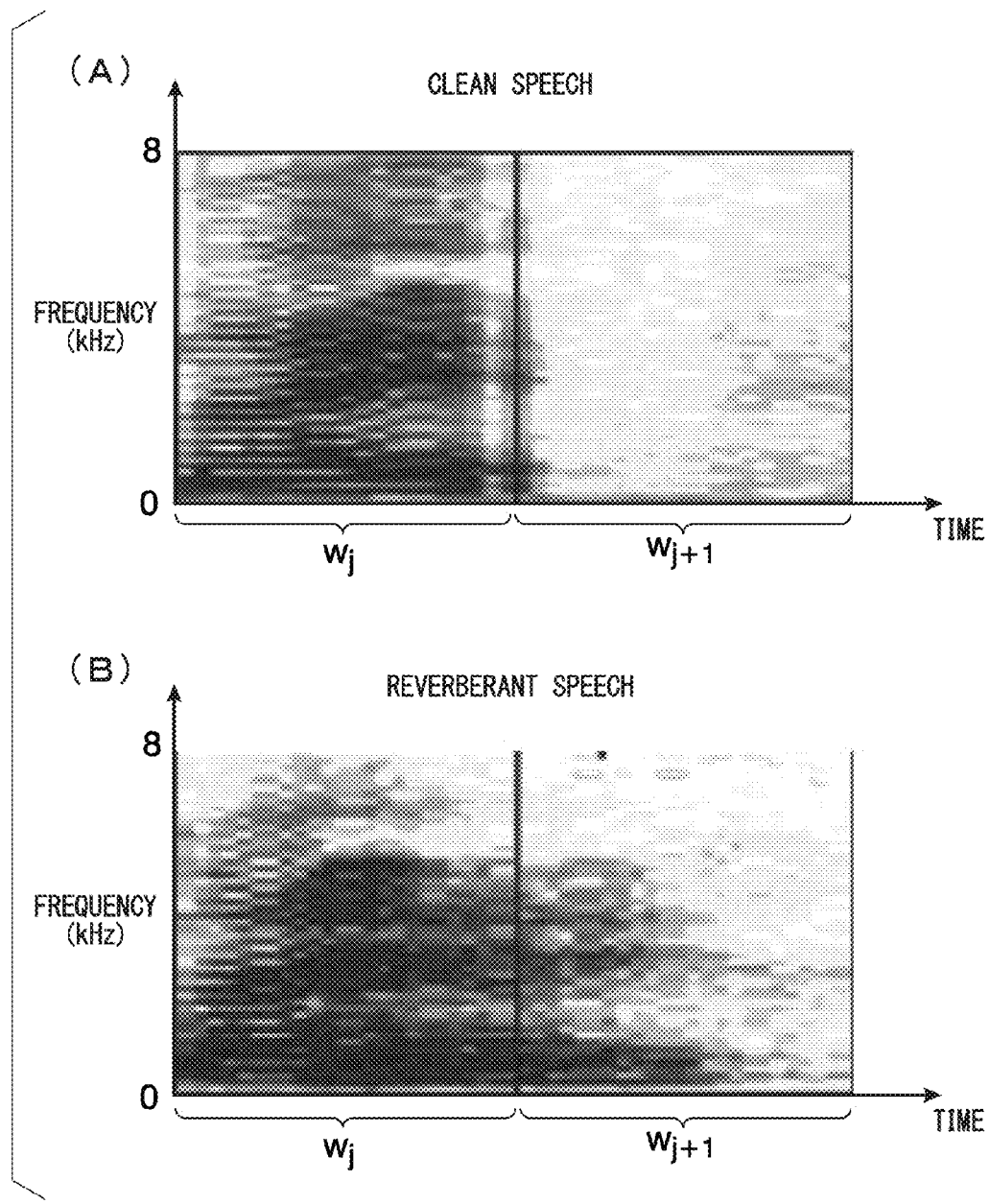
FIG. 3 is a diagram showing an example of intensity of a speech signal in a section in which a word is uttered.

FIG. 3 is a diagram showing an example of the intensity of a speech signal in a section in which words $w_j$ and $w_{j+1}$ are uttered. Part (A) of FIG. 3 shows a periodogram as an index of the intensity of a clean speech and Part (B) of FIG. 3 shows a spectrogram of a reverberant speech. In FIG. 3, the vertical axis and the horizontal axis represent the frequency and the time, respectively. The left part of FIG. 3 shows a section in which a word $w_j$ is uttered, and the right part of FIG. 3 shows a section in which a word $w_{j+1}$ is uttered. The darker portion represents the higher power, and the lighter portion represents the lower power.

In Part (A) of FIG. 3, in the clean speech, the section in which the word $w_j$ is uttered has the higher power than the section in which the word $w_{j+1}$ is uttered. Particularly, in the second half of the section in which the word $w_j$ is uttered, the power in the frequency band of 0 kHz to 1.3 kHz and the frequency band of 2.7 kHz to 5.2 kHz is higher than the power in other frequency bands. In the section in which the word $w_{j+1}$ is uttered, the power is rapidly lowered and the phenomenon in which the power in the frequency band of 0 kHz to 1.3 kHz and the frequency band of 2.7 kHz to 5.2 kHz is higher than the power in the other frequency bands does not occur.

In Part (B) of FIG. 3, in the reverberant speech, the power of the section in which the word $w_j$ is uttered is higher than the power of the section in which the word $w_{j+1}$ is uttered as a whole. However, in the first half of the section in which the word $w_{j+1}$ is uttered, there occurs a phenomenon in which the power in a specific frequency band is continued in the section in which the word $w_j$ is uttered. Particularly, the lower the frequency becomes, the more marked the phenomenon becomes. In this manner, in the reverberant speech, the reverberation influence occurs because the reverberation based on the speech of a word $w_j$ overlaps with the speech of a subsequent word $w_{j+1}$. The phenomenon in which the previous intensity is continued by this reverberation may be referred to as energy transfer. This phenomenon is one of the reverberation influences.

Example of Reverberation Influence Data

An example of the reverberation influence data stored in the reverberation influence storage unit 105 will be described below.

Figures 4, 5:
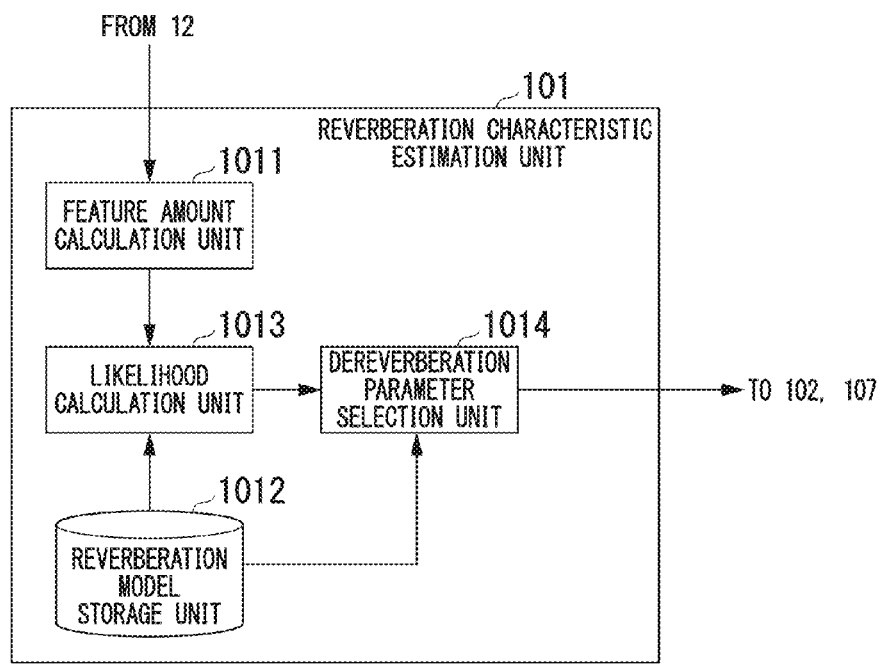
FIG. 4 is a diagram showing an example of reverberation influence data.
FIG. 5 is a block diagram showing a configuration of a reverberation characteristic estimation unit.

FIG. 4 is a diagram showing an example of the reverberation influence data.

The reverberation influence data shown in FIG. 4 is data in which (1) class c (where c is an integer of 1 to C and C is a predetermined integer, for example, 10000), (2) a power spectral density $D^{(c)}(\omega)$, and (3) a degree of reverberation influence $\tau^{(c)}$ are correlated with each other. Class c is an index for identifying each word pair.

In the example shown in FIG. 4, for example, class 1 is correlated with the power spectral density $D^{(1)}(\omega)$ and the degree of reverberation influence $\tau^{(1)}$.

As will be described later, class c of the word pair as a frequent word pair having the most approximate power spectral density $D^{(c)}(\omega)$ may be used for an infrequent word pair. Accordingly, it is possible to avoid bloating of an amount of data without damaging acoustic features.

Configuration of Reverberation Characteristic Estimation Unit

The configuration of the reverberation characteristic estimation unit 101 will be described below.

FIG. 5 is a block diagram showing the configuration of the reverberation characteristic estimation unit 101.

The reverberation characteristic estimation unit 101 includes a feature amount calculation unit 1011, a reverberation model storage unit 1012, a likelihood calculation unit 1013, and a dereverberation parameter selection unit 1014.

The feature amount calculation unit 1011 calculates a sound feature amount T of the speech signal input from the sound collection unit 12 for every predetermined time interval (for example, 10 ms). The sound feature amount T is a set of a static Mel-scale log spectrum (static MSLS), a delta MSLS, and one piece of delta power. This set of coefficients is also referred to as a feature vector.

The feature amount calculation unit 1011 outputs feature amount data indicating the calculated sound feature amount T to the likelihood calculation unit 1013.

Reverberation model data in which an adaptive acoustic model $\pi_{[r]}$ created in advance and a dereverberation parameter $\delta_{b,[r]}$ are correlated with each other for each distance r from a sound source to the sound collection unit 12 is stored in the reverberation model storage unit 1012.

The adaptive acoustic model $\pi_{[r]}$ is an acoustic model subjected to learning using a reverberant speech from a sound source with a distance of r so that the likelihood is maximized. The adaptive acoustic model $\pi_{[r]}$ is a Gaussian mixture model (GMM). The GMM is a kind of acoustic model in which an output probability of an input sound feature amount is weighted with a plurality of (for example, 256) normal distributions as bases. That is, the GMM is defined by statistics such as a mixed weighting coefficient, an average value, and a covariance matrix.

Here, the adaptive acoustic model $\pi_{[r]}$ associated with the distance r may be acquired as follows. First, an acoustic model $\pi^{(s)}$ is subjected to learning in advance using clean speeches so as to maximize the likelihood. An acoustic model $\pi^{(R)}$ is subjected to learning using reverberant speeches from a sound source with a predetermined distance R so as to maximize the likelihood. The feature amount of the acoustic model $\pi^{(s)}$ and the feature amount of the acoustic model $\pi^{(R)}$ are interpolated or extrapolated based on the distance r to create the adaptive acoustic model $\pi_{[r]}$.

The adaptive acoustic model $\pi_{[r]}$ may be created in advance from a given acoustic model, for example, an acoustic model $\pi^{(s)}$ associated with clean speeches using a maximum likelihood linear regression (MLLR) method.

The dereverberation parameter $\delta_{b,[r]}$ for each distance r may be calculated, for example, by dividing the power of the late reflection in band b from the sound source with the distance r by the power of the reverberant speech.

The likelihood calculation unit 1013 calculates the likelihood $L(T|\pi_{[r]})$ for each acoustic model $\pi_{[r]}$ stored in the reverberation model storage unit 1012 with respect to the sound feature amount T indicated by the feature amount data input from the feature amount calculation unit 1011, and outputs the calculated likelihood $L(T|\pi_{[r]})$ to the dereverberation parameter selection unit 1014.

The dereverberation parameter selection unit 1014 selects the dereverberation parameter $\delta_{b,[r]}$ corresponding to the maximum likelihood $\max(P(T|\pi_{[r]})$ out of the likelihoods $L(T|\pi_{[r]})$ input from the likelihood calculation unit 1013. The dereverberation parameter selection unit 1014 outputs the selected dereverberation parameter $\delta_{b,[r]}$ as the dereverberation parameter $\delta_b$, to the first dereverberation unit 102 and the second dereverberation unit 107.

The reverberation characteristic (for example, room transfer function (RTF)) of the reverberant speech used to acquire the adaptive acoustic model $\pi_{[r]}$ or the dereverberation parameter $\delta_{b,[r]}$ may be measured in advance. The reverberation characteristic may be calculated based on a predetermined function (for example, a function of adding a constant component to a component inversely proportional to the distance r). The speech processing device 11 may include a reverberation characteristic measuring unit (not shown) that measures the reverberation characteristic and may use the reverberation characteristic measured by the reverberation characteristic measuring unit to acquire the adaptive acoustic model $\pi_{[r]}$ or the dereverberation parameter $\delta_{b,[r]}$. When the speech processing device 11 includes the reverberation characteristic measuring unit (not shown), the reverberation characteristic estimation unit 101 may calculate the dereverberation parameter $\delta_b$ to be output to the first dereverberation unit 102 and the second dereverberation unit 107 from the reverberation characteristic measured by the reverberation characteristic measuring unit.

Process of Calculating Degree of Reverberation Influence

The process of calculating the degree of reverberation influence will be described below. The degree of reverberation influence is calculated in advance by the reverberation influence analyzing unit 110. The reverberation influence analyzing unit 110 may be incorporated into the speech processing device 11 or may be constructed separately from the speech processing device 11. The reverberation influence analyzing unit 110 may not be constituted by dedicated hardware and may be embodied by a computer, for example, by causing the computer to execute a program.

Figure 6:
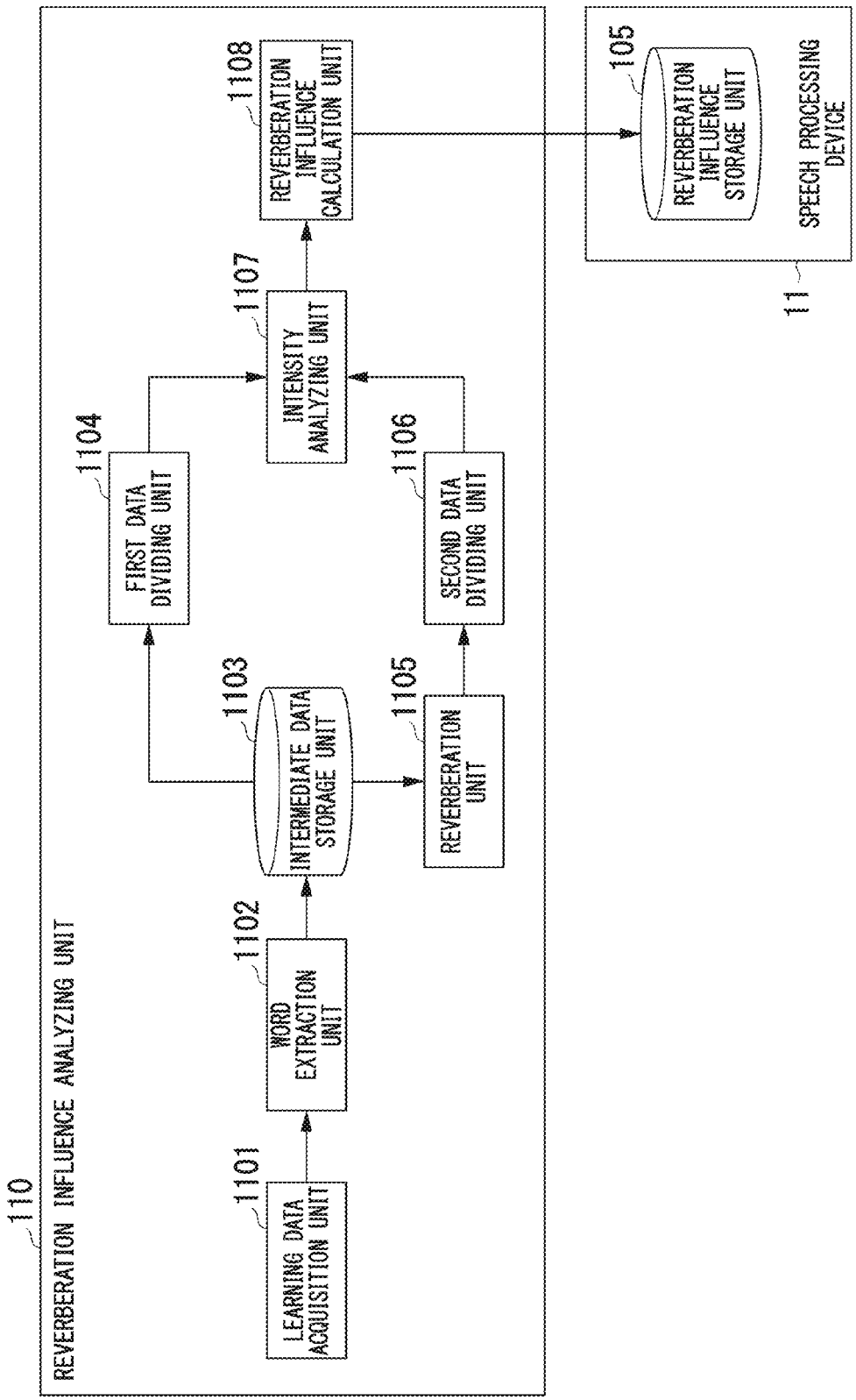
FIG. 6 is a block diagram showing a configuration of a reverberation influence analyzing unit.

FIG. 6 is a block diagram showing the configuration of the reverberation influence analyzing unit 110.

The reverberation influence analyzing unit 110 includes a learning data acquisition unit 1101, a word extraction unit 1102, an intermediate data storage unit 1103, a first data dividing unit 1104, a reverberation unit 1105, a second data dividing unit 1106, an intensity analyzing unit 1107, and a reverberation influence calculation unit 1108.

The learning data acquisition unit 1101 acquires learning data in which a speech signal and a word string indicating the speech details thereof are correlated with each other from the outside of the reverberation influence analyzing unit 110. A language expressing the speech details may be any language such as English and Japanese, as long as it is a natural language. The speech signals included in the learning data are speech signals of clean speeches. The learning data acquisition unit 1101 may acquire speeches uttered by a speaker close to the sound collection unit 12 as clean speeches and may constitute the learning data by correlating text data indicating the speech details with the speech signals. The learning data acquisition unit 1101 may acquire an existing speech database. The acquired speeches may include speeches uttered by a plurality of speakers. The learning data acquisition unit 1101 outputs speech signals indicating the acquired speeches to the word extraction unit 1102 in correlation with word strings.

The word extraction unit 1102 sequentially extracts word pairs including neighboring words from the word strings input from the learning data acquisition unit 1101. The word extraction unit 1102 extracts a speech signal of a section corresponding to a word pair extracted from the speech signal input from the learning data acquisition unit 1101. The word extraction unit 1102 sequentially stores intermediate data in which the extracted word pair and the speech signal of the section corresponding to the word pair are correlated with each other in the intermediate data storage unit 1103.

The first data dividing unit 1104 reads the intermediate data from the intermediate data storage unit 1103, divides the read intermediate data for each word pair, and generates first word pair data in which each word pair and the speech signal (clean speech) corresponding thereto are correlated with each other. The first data dividing unit 1104 divides the read intermediate data for each word and generates first word data in which each word and the speech signal (clean speech) corresponding thereto are correlated with each other. The first data dividing unit 1104 outputs the generated first word pair data and the generated first word data to the intensity analyzing unit 1107.

The reverberation unit 1105 reads the intermediate data from the intermediate data storage unit 1103, extracts a speech signal from the read intermediate data, and adds a predetermined reverberation characteristic to the extracted speech signal to generate a speech signal indicating a reverberant speech. The reverberation characteristic added by the reverberation unit 1105 may be any reverberation characteristic as long as it is equal to the reverberation characteristic used in the reverberation characteristic estimation unit 101. The reverberation unit 1105 replaces the speech signal included in the intermediate data with the generated speech signal (reverberant speech) and outputs the intermediate data in which the speech signal is replaced to the second data dividing unit 1106.

The second data dividing unit 1106 divides the intermediate data input from the reverberation unit 1105 for each word pair and generates second word pair data in which each word pair and a speech signal (reverberant speech) corresponding thereto are correlated with each other. The second data dividing unit 1106 divides the input intermediate data for each word and generates second word data in which each word and a speech signal (reverberant speech) corresponding thereto are correlated with each other. The second data dividing unit 1106 outputs the generated second word pair data and the generated second word data to the intensity analyzing unit 1107.

The intensity analyzing unit 1107 calculates indices indicating the intensities of the speech signals included in the first word pair data and the first word data input from the first data dividing unit 1104 and the second word pair data and the second word data input from the second data dividing unit 1106. The intensity analyzing unit 1107 calculates, for example, spectral densities as the indices.

Here, the intensity analyzing unit 1107 calculates a periodogram $P_s(\omega, m)$ from the speech signals (clean speeches) included in the first word pair data, and substitutes the calculated periodogram $P_s(\omega, m)$ for $P_r(\omega, m)$ of Expression (3). Accordingly, the power spectral density $D_{s,tj}(\omega)$ of the word pair $t_j$ is calculated. The intensity analyzing unit 1107 calculates a periodogram $P_r(\omega, m)$ from the speech signals (reverberant speeches) included in the second word pair data, and calculates the power spectral density $D_{r,tj}(\omega)$ of the word pair $t_j$ using Expression (3) with respect to the calculated periodogram $P_r(\omega, m)$.

The intensity analyzing unit 1107 calculates a periodogram $P_s(\omega, m)$ from the speech signals (clean speeches) included in the first word data and calculates the power spectral density $D_{s,wj}(\omega)$ of the word $w_j$ using Expression (5) with respect to the calculated periodogram $P_s(\omega, m)$.

$$D_{s,w_j}(\omega) = \frac{1}{M_{w_j}} \sum_{m=0}^{M_{w_j}-1} P_s(\omega, m) \quad (5)$$

In Expression (5), $M_{wj}$ represents the number of frames of the section in which the word $w_j$ is uttered. Accordingly, the power spectral density $D_{s,wj}(\omega)$ is the average value of the square value of the component of the frequency $\omega$ in the section in which the word $w_j$ is uttered.

The intensity analyzing unit 1107 calculates a periodogram $P_r(\omega, m)$ from the speech signals (reverberant speeches) included in the second word data and substitutes the calculated periodogram $P_r(\omega, m)$ for $P_s(\omega, m)$ of Expression (5) to calculate the power spectral density $D_{s,wj}(\omega)$ of the word $w_j$.

Similarly, the intensity analyzing unit 1107 calculates the power spectral densities $D_{r,wj+1}(\omega)$ and $D_{s,wj+1}(\omega)$ of the word $w_{j+1}$ included in the word pair $t_j$ using Expression (5).

The intensity analyzing unit 1107 counts the appearance frequency of each word pair $t_j$. The intensity analyzing unit 1107 may sequentially arrange the word pairs $t_j$ in the descending order of the counted frequencies and may allocate integers of 1 to C as classes c to from the word pair having the highest frequency to the word pair having the C-th highest frequency. These C classes are called base classes. Integers of 1 to L (where L is an integer obtained by subtracting C from the total number of types of appearing word pairs $t_j$) as class 1 are allocated to the other word pairs $t_j$. These classes are called infrequent pairs classes. Accordingly, data on frequent word pairs and data on infrequent word pairs are sorted.

The intensity analyzing unit 1107 calculates similarity sim to the power spectral density $D_{s,tj}(\omega)$ of the word pairs belonging to the base classes for each power spectral density $D_{s,tj}(\omega)$ of the word pairs belonging to the infrequent word pair classes, for example, using Expression (2). The intensity analyzing unit 1107 selects class c of the word pair belonging to the base class having the highest similarity for each power spectral density $D_{s,tj}(\omega)$ of the word pairs belonging to the infrequent word pair class.

Accordingly, base class c of the word pair in which the power spectral density $D_{s,tj}(\omega)$ is most approximate to the word pair belonging to the infrequent word pair class is determined.

The intensity analyzing unit 1107 outputs the power spectral densities $D_{r,tj(\omega)}$, $D_{s,wj}(\omega)$, $D_{r,wj+1}(\omega)$, and $D_{s,wj+1}(\omega)$ calculated for the word pairs $t_j$ belonging to the base classes to the reverberation influence calculation unit 1108. These power spectral densities are output in correlation with classes c allocated to the word pairs $t_j$.

The reverberation influence calculation unit 1108 calculates the degree of reverberation influence $\tau_j^{(c)}$ based on the power spectral densities $D_{s,wj}(\omega)$, $D_{r,wj+1}(\omega)$, and $D_{s,wj+1}(\omega)$ for each class c input from the intensity analyzing unit 1107. The reverberation influence calculation unit 1108 uses, for example, Expression (6) to calculate the degree of reverberation influence $\tau_j^{(c)}$.

$$\tau_j^{(c)} = \frac{D_{r,w_{j+1}}(\omega) - D_{s,w_j}(\omega)}{D_{s,w_j}(\omega)} \tag{6}$$

The numerator of Expression (6) is a value obtained by subtracting the intensity of the clean speech of the word from the intensity of the reverberant speech of the word $w_{j+1}$, that is, a value indicating the reverberation intensity in the word $w_{j+1}$ subsequent to the word $w_j$. The denominator of Expression (6) is the intensity of the clean speech of the word $w_j$.

In other words, the degree of reverberation influence $\tau_j^{(c)}$ indicates the degree of influence of the reverberation of the word $w_j$ to the speech of the subsequent word $w_{j+1}$.

The reverberation influence calculation unit 1108 correlates the power spectral density $D_{r,tj}(\omega)$ input from the intensity analyzing unit 1107 and the calculated degree of reverberation influence $\tau_j^{(c)}$ as the power spectral density $D^{(c)}(\omega)$ and the calculated degree of reverberation influence $\tau^{(c)}$ with class c and generates the reverberation influence data. The reverberation influence calculation unit 1108 stores the generated reverberation influence data in the reverberation influence storage unit 105.

Another Example of Reverberation Removal

The processes (see Expressions (1) and (4)) of removing a reverberation component from a reverberant speech signal using a spectral subtraction method are described above, which are performed by the first dereverberation unit 102 and the second dereverberation unit 107, respectively. Here, the first dereverberation unit 102 and the second dereverberation unit 107 are not limited to these processes, and may perform processes of removing a reverberation component from a reverberant speech based on a Wiener filtering method, respectively. The Wiener filtering method is a method of forming a linear filter (also referred to as Wiener weighting) for minimizing an average square error of a filtered reverberant speech signal and a dereverberated speech signal under the assumption that there is no correlation between a reverberation component and a dereverberated speech signal. The formed linear filter is used to filter a reverberant speech signal to generate a dereverberated speech signal.

Here, the speech processing device 11 includes a voice activity detection unit (not shown) that performs a voice activity detection (VAD) process on the input speech signal.

The voice activity detection process is a process of determining whether a speech signal includes a speech (sounded/soundless).

The voice activity detection process is a process of determining that a speech signal is sounded, for example, when the power of the speech signal is greater than a predetermined threshold value and the number of zero crossings is in a predetermined range (for example, greater than 200 times per second) and determining that the speech signal is soundless otherwise. The number of zero crossings is the number of times in which a signal value in the time domain crosses zero per unit time, that is, the number of times in which the signal value varies from a negative value to a positive value or from a positive value to a negative value per unit time.

The first dereverberation unit 102 performs wavelet transform on a speech signal input from the sound collection unit 12 and calculates a wavelet coefficient W(a). Here, a represents a scale. The scale is a coefficient indicating a base characteristic used for the wavelet transform. The first dereverberation unit 102 calculates the k-th wavelet coefficient $w_{bk}$ in the frequency band b from the calculated wavelet coefficient W(a). Here, the first dereverberation unit 102 sets the power of the scale a in the frequency band b of the speech signal in the section determined to be soundless just before by the voice activity detection unit as the power $l_b(a)^2$ of the late reflection component. The first dereverberation unit 102 subtracts the power $l_b(a)^2$ of the late reflection component from the power of the scale a in the frequency band b of the speech signal in the section determined to be sounded and sets the resultant as the power $e_b(a)^2$ of the first dereverberated speech signal.

The first dereverberation unit 102 calculates a linear filter $k_b'$ of the frequency band b, for example, using Expression (7).

$$\kappa_b' = \frac{e_b(a)^2}{e_b(a)^2 + \delta_b l_b(a)^2} \tag{7}$$

The first dereverberation unit 102 calculates the k-th wavelet coefficient $w_{bk}'$ of the first dereverberated speech signal in the frequency band b, for example, using Expression (8) based on the linear filter $k_b'$ and the k-th wavelet coefficient $w_{bk}$ in the frequency band b.

$$w_{bk}' = \kappa_b' \cdot w_{bk} \tag{8}$$

Then, the first dereverberation unit 102 synthesizes the power $e_b(a)^2$ of the first dereverberated speech signal from the calculate wavelet coefficient $w_{bk}'$. The first dereverberation unit 102 subtracts the synthesized power $e_b(a)^2$ of the first dereverberated speech signal from the power of the speech signal (reverberant signal) and synthesizes the power $l_b(a)^2$ of the late reflection component. The first dereverberation unit 102 determines the dereverberation parameter $\delta_b$ so as to minimize the square error of the synthesized power $e_b(a)^2$ and $l_b(a)^2$ and the power $e_b(a)^2$ and $l_b(a)^2$ determined based on the voice activity detection.

The first dereverberation unit 102 performs inverse wavelet transform on the wavelet coefficient $w_{bk}'$ obtained based on the determined dereverberation parameter $\delta_b$ to generate the first dereverberated speech signal and outputs the generated first dereverberated speech signal to the first speech recognition unit 103.

The second dereverberation unit 107 applies the Wiener filtering method to the word pair-section speech signal to generate a second dereverberated speech signal and outputs the generated second dereverberated speech signal to the second speech recognition unit 108. The second dereverberation unit 107 uses Expressions (9) and (10) instead of Expressions (7) and (8).

$$\kappa_b'' = \frac{e_b(a)^2}{e_b(a)^2 + \tau_j \delta_b l_b(a)^2} \quad (9)$$

$$w_{bk}'' = \kappa_b'' \cdot w_{bk} \quad (10)$$

That is, Expression (9) represents that the power of the late reflection component is additionally weighted with the degree of reverberation influence $\tau_j$ to calculate a linear filter $k_b''$ of the frequency band b.

Expression (10) represents that the wavelet coefficient $w_{bk}''$ is calculated using the linear filter $k_b''$. The calculated wavelet coefficient $w_{bk}''$ is used to generate the second dereverberated speech signal by performing the inverse wavelet transform after the dereverberation parameter $\delta_b$ is determined.

Speech Processing

The speech processing according to the first embodiment will be described below.

Figure 7:
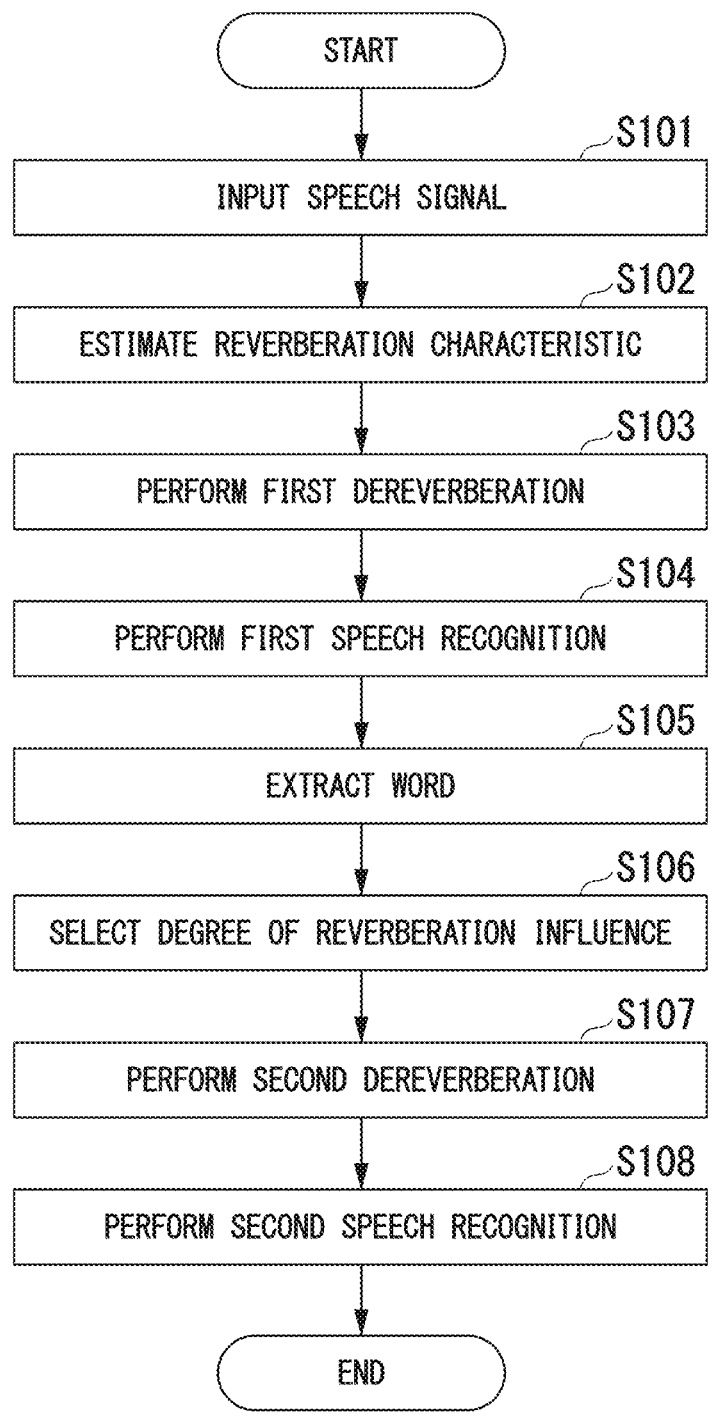
FIG. 7 is a flowchart showing a speech processing flow according to the first embodiment of the present invention.

FIG. 7 is a flowchart showing the speech processing according to the first embodiment.

(Step S101) A speech signal is input to the reverberation characteristic estimation unit 101, the first dereverberation unit 102, and the word extraction unit 104 from the sound collection unit 12. Thereafter, the process flow goes to step S102.

(Step S102) The reverberation characteristic estimation unit 101 estimates the dereverberation parameter $\delta_b$ of the reverberation characteristics of the reverberation overlapping with the input speech signal. The reverberation characteristic estimation unit 101 outputs the estimated dereverberation parameter $\delta_b$ to the first dereverberation unit 102 and the second dereverberation unit 107. Thereafter, the process flow goes to step S103.

(Step S103) The first dereverberation unit 102 removes the reverberation component from the speech signal input from the sound collection unit 12 based on the dereverberation parameter $\delta_b$ input from the reverberation characteristic estimation unit 101. The first dereverberation unit 102 outputs the first dereverberated speech signal from which the reverberation component is removed to the first speech recognition unit 103. Thereafter, the process flow goes to step S104.

(Step S104) The first speech recognition unit 103 performs a speech recognizing process on the first dereverberated speech signal input from the first dereverberation unit 102 and outputs first recognition data indicating the recognized speech details to the word extraction unit 104. Thereafter, the process goes to step S105.

(Step S105) The word extraction unit 104 sequentially extracts word pairs from the word string indicated by the first recognition data input from the first speech recognition unit 103. The word extraction unit 104 extracts a speech signal in a section corresponding to the word group extracted from the speech signal input from the sound collection unit 12. The word extraction unit 104 outputs the extracted word pairs and the speech signal in the section corresponding to the word pairs to the reverberation influence selection unit 106. Thereafter, the process flow goes to step S106.

(Step S106) The word pairs and the speech signal of the section corresponding to the word pairs are input to the reverberation influence selection unit 106 from the word extraction unit 104. The reverberation influence selection unit 106 calculates the power spectral density of the input speech signal and selects the degree of reverberation influence corresponding to the power spectral density most approximate to the calculated power spectral density from the reverberation influence storage unit 105.

The reverberation influence selection unit 106 outputs the selected degree of reverberation influence and the word pairs input from the word extraction unit 104 to the second dereverberation unit 107. Thereafter, the process flow goes to step S107.

(Step S107) The second dereverberation unit 107 extracts the speech signal corresponding to the word pairs input from the word extraction unit 104 as the word pair-section speech signal from the speech signal input from the sound collection unit 12. The second dereverberation unit 107 calculates a reverberation component using the extracted word pair-section speech signal and the dereverberation parameter $\delta_b$ input from the reverberation characteristic estimation unit 101, and weights the calculated reverberation component using the degree of reverberation influence input from the reverberation influence selection unit 106. The second dereverberation unit 107 removes the weighted reverberation component from the word pair-section speech signal to generate the second dereverberated speech signal. Thereafter, the process flow goes to step S108.

(Step S108) The second speech recognition unit 108 performs a speech recognizing process on the second dereverberated speech signal input from the second dereverberation unit 107 and outputs second recognition data indicating the recognized speech details to the outside of the speech processing device 11. Thereafter, the process flow shown in FIG. 7 ends.

In this manner, the speech processing device 11 according to the first embodiment includes the speech recognition unit (the first speech recognition unit 103) that sequentially recognizes uttered words based on an input speech and the reverberation influence storage unit (the reverberation influence storage unit 105) that stores the degree of reverberation influence indicating the influence of a reverberation based on a speech of at least one word to a speech of a subsequent word and the intensity of a speech of a word group including the at least one word and subsequent words in correlation with each other. The speech processing device 11 according to the first embodiment further includes the reverberation influence selection unit (the reverberation influence selection unit 106) that selects the degree of reverberation influence corresponding to the intensity most approximate to the intensity of the input speech from the reverberation influence storage unit for each word group (for example, word pair) including a predetermined number of words out of the words recognized by the speech recognition unit.

The speech processing device 11 according to the first embodiment includes the reverberation reduction unit (the second dereverberation unit 107) that removes the reverberation component, which is weighted with the degree of reverberation influence, from the speech of the at least one word of the word group.

Accordingly, the reverberation component weighted with the degree of reverberation influence indicating the influence of the reverberation based on the speech of at least one word to the speech of a subsequent word is subtracted from the speech of the at least one word of the word group. As a result, since the reverberation reduction is performed in consideration of the mutual influence between words, it is possible to improve speech recognition accuracy.

Second Embodiment

A second embodiment of the present invention will be described below with reference to the accompanying drawings. The same elements as described in the above-mentioned embodiment will be referenced by the same reference numerals and description thereof will be invoked.

Figure 8:
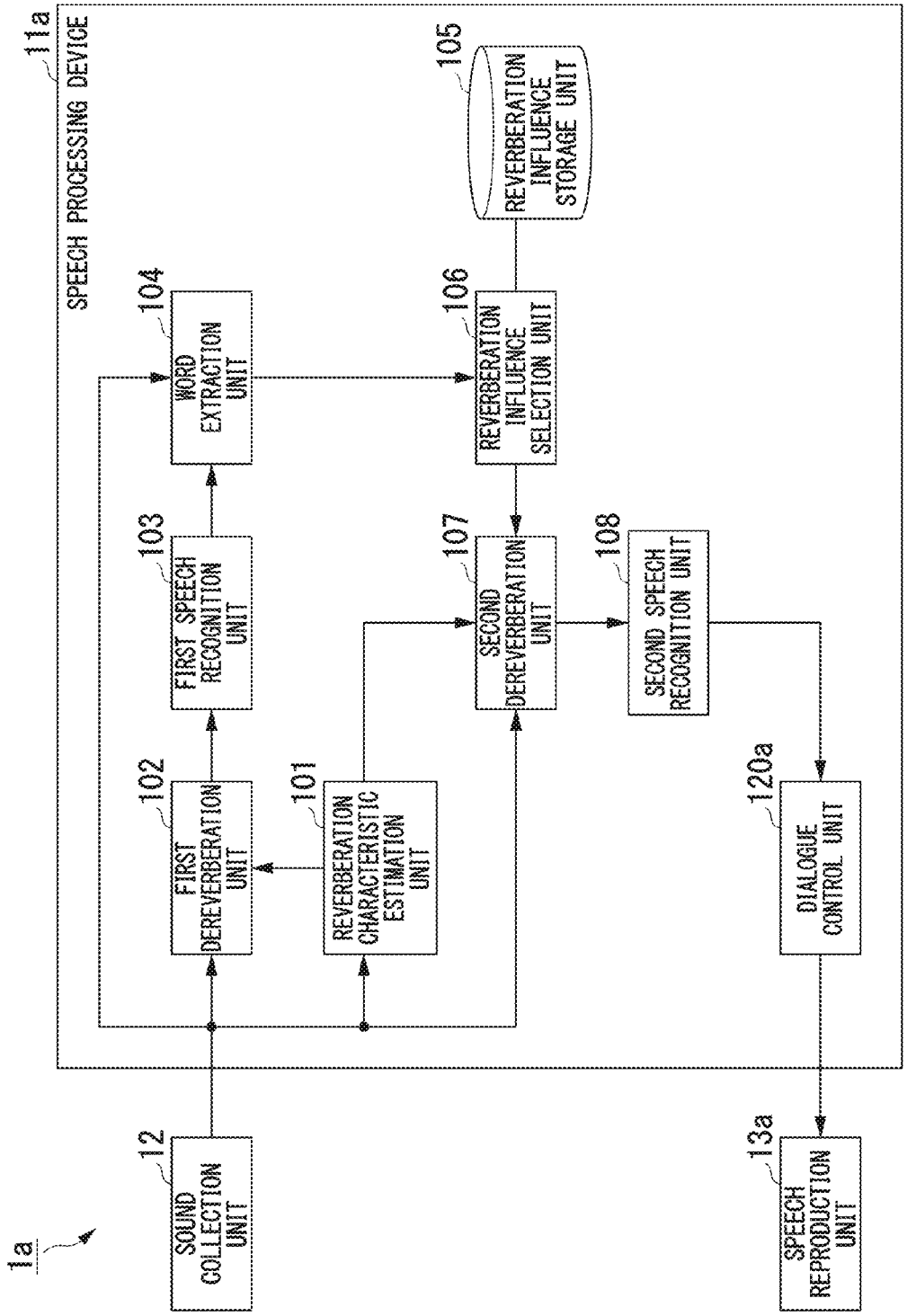
FIG. 8 is a block diagram showing a configuration of a speech processing system according to a second embodiment of the present invention.

FIG. 8 is a block diagram showing a configuration of a speech processing system 1a according to the second embodiment.

The speech processing system 1a includes a speech processing device 11a, a sound collection unit 12, and a speech reproduction unit 13a. The speech processing system 1a is an dialogue system that generates a speech signal indicating response details in response to speech details recognized through the speech recognizing processing by the speech processing device 11a.

The speech reproduction unit 13a reproduces a speech based on the speech signal input from the speech processing device 11a. The speech reproduction unit 13a is, for example, a speaker.

The speech processing device 11a includes a reverberation characteristic estimation unit 101, a first dereverberation unit 102, a first speech recognition unit 103, a word extraction unit 104, a reverberation influence storage unit 105, a reverberation influence selection unit 106, a second dereverberation unit 107, a second speech recognition unit 108, and a dialogue control unit 120a. That is, the speech processing device 11a includes the dialogue control unit 120a in addition to the configuration of the speech processing device 11 (FIG. 1).

The dialogue control unit 120a acquires response data based on the second recognition data input from the second speech recognition unit 108. The dialogue control unit 120a performs an existing text-speech synthesizing process on response text indicated by the acquired response data to generate a speech signal (response speech signal) corresponding to the response text. The dialogue control unit 120a outputs the generated response speech signal to the speech reproduction unit 13a.

Here, the dialogue control unit 120a includes a storage unit (not shown) in which sets of recognition data and response data are stored in advance in correlation with each other and a speech synthesizing unit (not shown) that synthesizes a speech signal corresponding to the response text indicated by the response data.

The response data is data in which predetermined recognition data and response data indicating the response text corresponding thereto are correlated with each other. Now, an example of response data will be described.

FIG. 9 is a diagram showing an example of response data.

In the response data shown in FIG. 9, a paragraph having a character such as Sp1 located at the head represents recognition data, and a paragraph having a character such as Rb1 located at the head represents response data.

For example, the first recognition data (Sp1) is recognition data including an English text "Hello, my friend and I went to a sushi bar yesterday and ordered Sweetfish. Can you give us information of that fish?" The first response data (Rb1) is data including an English text "Sweetfish is common in South East Asia. An edible fish known to its distinctive sweet flavor with melon and cucumber aromas." In this example, the dialogue control unit 120a generates response data by substituting a part of the recognition data, for example, "Sweetfish".

In this manner, since the speech processing device 11a according to the second embodiment has the same configuration as the speech processing device 11 according to the first embodiment, it is possible to improve speech recognition accuracy of a reverberant speech. Accordingly, since the response data corresponding to the recognition data indicating the recognized speech details is accurately selected, it is possible to implement more suitable dialogue.

Test Result

A test result in which the speech recognition accuracy was verified using the speech processing device 11a will be described below.

The test was carried out in test rooms A and B of which the reverberation time (RT) was 240 ms and 640 ms.

FIG. 10 is a plan view showing an arrangement example of a speaker Sp and a sound collection unit 12 in test room B.

The inner dimension of test room B included a length of 5.5 m, a width of 4.8 m, and a height of 4.0 m.

In test room B, the speech processing device 11a was incorporated into the body of a humanoid robot Rb and the sound collection unit 12 was incorporated into the head of the robot. The sound collection unit 12 was a microphone array including eight microphones and a speech signal recorded with one microphone of the eight microphones was input to the speech processing device 11a. Here, the speech recognition rate of a speech uttered by the speaker Sp was observed. The speech recognition rate was observed when the distance from the sound collection unit 12 to the speaker Sp was 0.5 m, 1.0 m, 1.5 m, and 2.0 m. Test room A had the same size as test room B, and the speech recognition rate was observed under the same positional relationship between the speaker Sp and the sound collection unit 12.

In the test, the number of words to be recognized was set to 2000 and a dialogue was made about the sushi and the sashimi which are Japanese traditional dishes (see FIG. 9). In the dialogue, each speaker Sp uttered a question to the robot Rb and the speech processing device 11a recognized the speech based on the utterance. The speech processing device 11a reproduced a speech based on the response data corresponding to recognition data obtained through the recognition. Here, the dialogue control unit 120a included the name of the fish which had been successfully recognized as a part of the recognition data in the response data. Accordingly, it was determined whether the reproduced speech was true or false depending on whether the name of the fish as an object uttered by the speaker Sp was included in the reproduced speech.

The number of speakers participating in the test was 20 and each speaker was made to utter 10 questions to the robot Rb.

The acoustic model used by the first speech recognition unit 103 and the second speech recognition unit 108 was a English triphone HMM. The acoustic model was subjected to learning in advance using a database of the Wall Street Journal including speeches obtained by reading English journal articles as learning data.

The speech recognition rate was observed using speech signals which had been processed by the following six methods.

Method A: Not processed (not enhanced)
Method B: Existing blind dereverberation
Method C: Wiener filtering method of the related art
Method D: Removal of late reflection component by the second dereverberation unit 107 based on the Wiener filtering method (second embodiment)
Method E: Spectral subtraction method of the related art
Method F: Removal of late reflection component by the second dereverberation unit 107 based on the spectral subtraction method (second embodiment)

Example of Speech Recognition Rate

FIGS. 11 and 12 are diagrams showing examples of the speech recognition rate for each processing method.

FIGS. 11 and 12 show recognition rates (with a unit of %) obtained in test rooms A and B, respectively. The columns represent the method (Methods A to F) of processing an uttered speech and the rows represent the distance r.

Out of test rooms A and B, the speech recognition rate was lower in test room B having the longer reverberation time. In the same test room, the larger the distance became, the lower the speech recognition rate became. The speech recognition rate approximately increases in the order of Methods A, B, C, E, D, and F. For example, in the case of test room B and the distance of r=2.0 m, 65.4% in Method D of the second embodiment was significantly higher than 55.2% in Method C of the related art. 68.3% in Method F of the second embodiment was significantly higher than 57.1% in Method E of the related art. This result shows that the speech recognition rate is improved in comparison with the related art by weighting the late reflection component with the degree of reverberation influence and performing the dereverberation process. When the reverberation influence is small as in the cases of the distance r=0.5 m and 1.0 m in FIG. 11 (test room A), no significant difference in the speech recognition rate appeared among Methods A to F.

Third Embodiment

A third embodiment of the present invention will be described below with reference to the accompanying drawings. The same elements as described in the above-mentioned embodiment will be referenced by the same reference numerals and description thereof will be invoked.

Figure 13:
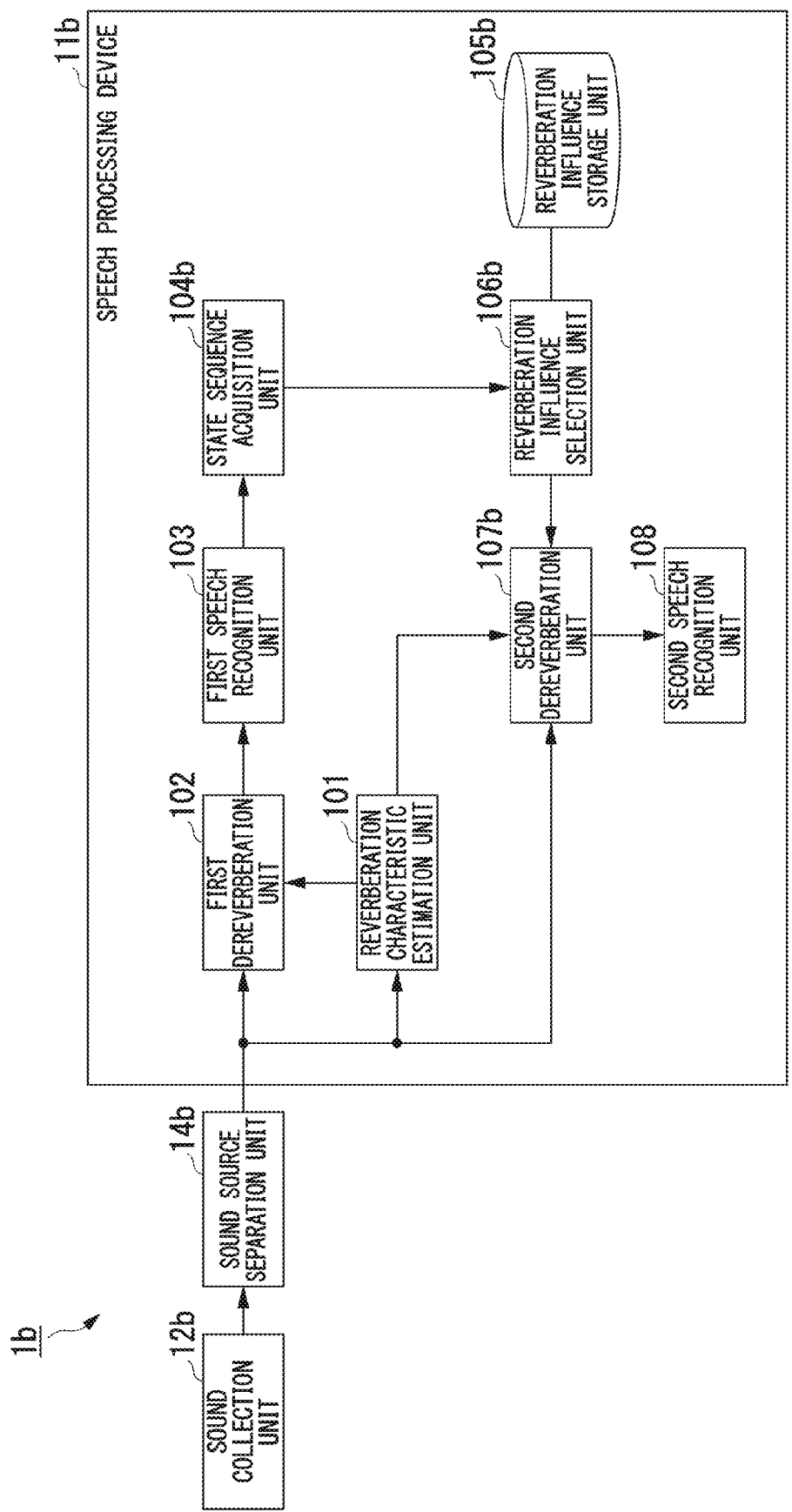
FIG. 13 is a block diagram showing a configuration of a speech processing system according to a third embodiment of the present invention.
Figure 16A:
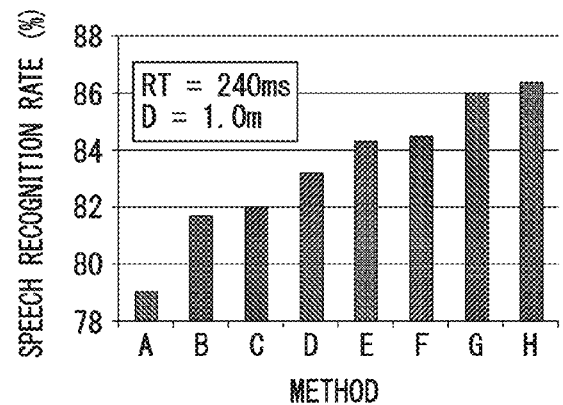
FIGS. 16A, 16B, and 16C are diagrams showing an example of a speech recognition rate by processing methods.
Figure 16B:
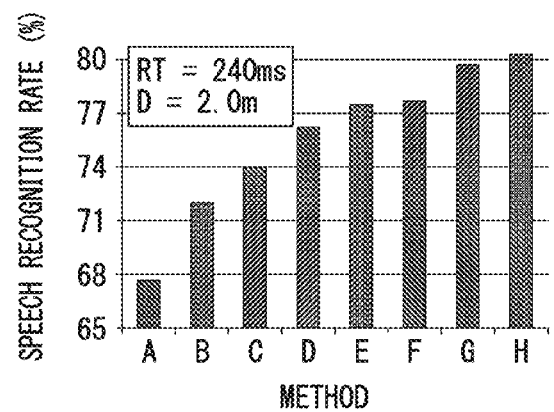
Figure 16C:
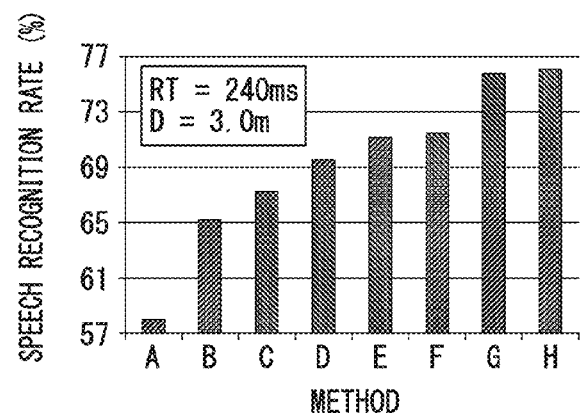
Figure 17A:
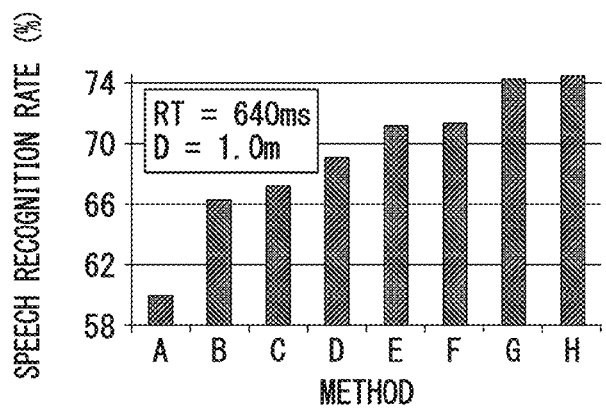
FIGS. 17A, 17B, and 17C are diagrams showing another example of a speech recognition rate by processing methods.
Figure 17B:
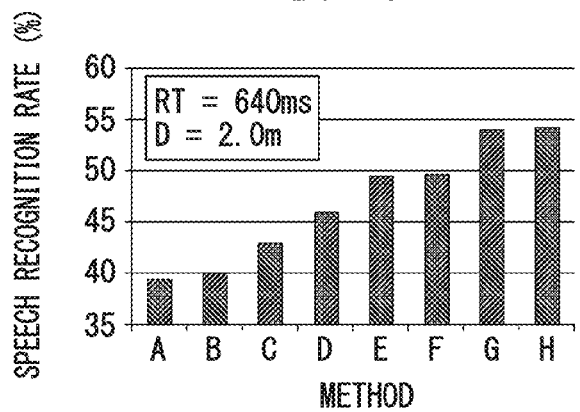
Figure 17C:
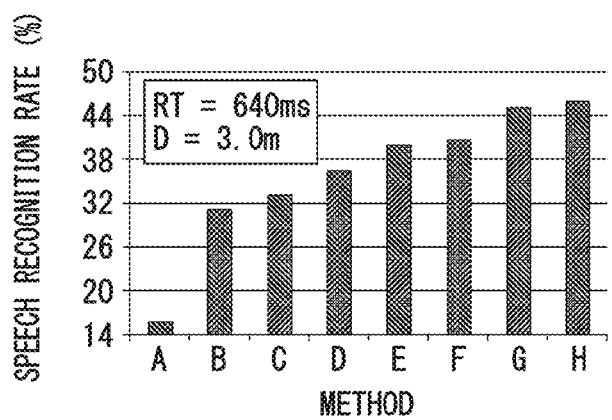

FIG. 13 is a block diagram showing a configuration of a speech processing system 1b according to the third embodiment.

The speech processing system 1b includes a speech processing device 11b, a sound collection unit 12b, and a sound source separation unit 14b.

The sound collection unit 12b records speech signals of M channels (where M is a predetermined integer greater than 1) and outputs the recorded speech signals of M channels to the sound source separation unit 14b. The sound collection unit 12b is a microphone array including M microphones at different positions. The speech processing system 1b may be implemented as a configuration in which M=1 is set and the sound source separation unit 14b shown in FIG. 13 is skipped.

The sound source separation unit 14b performs a sound source separating process on speech signals received from S (where S is a predetermined integer of 1 to M) sound sources and obtained as the speech signals of M channels input from the sound collection unit 12b and separates the speech signals depending on the sound sources. The sound source separation unit 14b performs a voice activity detecting process on the separated speech signals and detects a voiced section. The sound source separation unit 14b outputs the speech signal of the detected voiced section to the speech processing device 11b. When the voiced section is detected for a plurality of sound sources, the sound source separation unit 14b may output the voiced section for each sound source to the speech processing device 11b or may output the speech signal from the sound source having the largest power to the speech processing device 11b.

The sound source separation unit 14b uses, for example, a geometric-constrained high order decorrelation-based source separation (GHDSS) method as the sound source separating process. The GHDSS method is a method of adaptively calculating a separation matrix $V(\omega)$ so as to reduce a separation sharpness $J_{SS}([V(\omega)])$ and a geometric constraint $J_{GC}([V(\omega)])$ as two cost functions. The separation matrix $V(\omega)$ is a matrix used to calculate a speech signal (estimated value vector) $[u'(\omega)]=[u_1'(\omega), u_2'(\omega), \ldots, u_S'(\omega)]^T$ for each sound source of S channels by multiplying the speech signals $[x(\omega)]=[x_1(\omega), x_2(\omega), \ldots, x_M(\omega)]^T$ of M channels input from the sound collection unit 12 thereby. Here, [ ... ] represents a vector or a matrix. $[\ldots]^T$ represents the transpose of a matrix or a vector.

The separation sharpness $J_{SS}([V(\omega)])$ and the geometric constraint $J_{GC}([V(\omega)])$ are expressed by Expressions (11) and (12).

$$J_{SS}([V(\omega)])=\|\phi([u'(\omega)])[u'(\omega)]^H-\text{diag}[\phi([u'(\omega)])] [u'(\omega)]^H\|^2 \tag{11}$$

$$J_{GC}([V(\omega)])=\|\text{diag}[[V(\omega)][A(\omega)]-[I]]\|^2 \tag{12}$$

In Expression (11), $\|\ldots\|^2$ represents a Frobenius norm of a matrix . . . . The Forbenius norm is the square sum (scalar value) of element values of a matrix. $\phi([u'(\omega)])$ is a nonlinear function, for example, a hyperbolic tangent function, of a speech signal $[u'(\omega)]$. $[\ldots]^H$ represents the conjugate transpose of a matrix or a vector. Diag[ ... ] represents the total sum of diagonal components of a matrix . . . . Accordingly, the separation sharpness $J_{SS}([V(\omega)])$ is an index value indicating the magnitude of off-diagonal component between channels in a spectrum of the speech signal (estimated value), that is, a degree by which a certain sound source is erroneously separated as another sound source.

In Expression (12), $[A(\omega)]$ represents a transfer function matrix having transfer function from a certain sound source to a certain microphone as an element. [I] represents a unit matrix. Accordingly, the geometric constraint $J_{GC}([V(\omega)])$ is an index value indicating a degree of error between the spectrum of the speech signal (estimated value) and the spectrum of the speech signal (sound source).

The sound source separation unit 14b calculates separated speech signals $([u'(\omega)])$ including S sound sources by multiplying the speech signals $[x(\omega)]$ of M channels input from the sound collection unit 12 by the separation matrix $V(\omega)$ as described above.

$$[u'(\omega)]=[V(\omega)][x(\omega)] \tag{13}$$

The speech processing device 11b includes a reverberation characteristic estimation unit 101, a first dereverberation unit 102, a first speech recognition unit 103, a state sequence acquisition unit 104b, a reverberation influence storage unit 105b, a reverberation influence selection unit 106b, a second dereverberation unit 107b, and a second speech recognition unit 108b.

The state sequence acquisition unit 104b sequentially acquires state sequence information indicating a state sequence in a section in which a word group including N (where N is a predetermined integer greater than 1, for example, 2) neighboring recognized words is recognized out of state sequences generated by the speech recognizing process of the first speech recognition unit 103. In the above-mentioned embodiment, words are used as a recognition segment by the first speech recognition unit 103, and in the third embodiment, a state of utterance is used as the recognition segment and a state sequence including a plurality of neighboring states is used by the state sequence acquisition unit 104b. Here, the first speech recognition unit 103 specifies possible states from the sound feature amount calculated for each frame with reference to a predetermined acoustic model. The first speech recognition unit 103 calculates a likelihood for each state sequence candidate including the specified states, and determines the state sequence of which the calculated likelihood is the highest.

In the below description, the acoustic model used by the first speech recognition unit 103 may be referred to as "first acoustic model" so as to be distinguished from the acoustic model (second acoustic model) used by the second speech recognition unit 108. The state sequence acquisition unit 104b outputs the input state sequence information to the reverberation influence selection unit 106b.

The reverberation influence storage unit 105b stores reverberation influence data in which the state sequence information and the degree of reverberation influence $\tau_W$ are correlated with each other in advance. In the third embodiment, the degree of reverberation influence $\tau_W$ is a parameter indicating a degree of influence of the reverberation based on a preceding speech to a subsequent speech in the section corresponding to the state sequence. The process of calculating the degree of reverberation influence $\tau_W$ will be described later.

The reverberation influence selection unit 106b selects the degree of reverberation influence $\tau_W$ corresponding to the state sequence information input from the state sequence acquisition unit 104b from the reverberation influence storage unit 105b. The reverberation influence selection unit 106b calculates dissimilarity (for example, Hamming distance) between the state sequence indicated by the input state sequence information and the state sequence indicated by the state sequence information correlated with the degree of reverberation influence $\tau_W$ and selects the degree of reverberation influence $\tau_W$ corresponding to the state sequence of which the calculated dissimilarity is the smallest. The reverberation influence selection unit 106b outputs the selected degree of reverberation influence $\tau_W$ to the second dereverberation unit 107b.

The second dereverberation unit 107b outputs the speech signal of the section corresponding to the state sequence acquired by the state sequence acquisition unit 104b out of the speech signals input from the sound source separation unit 14b as a state sequence-section speech signal. The second dereverberation unit 107b removes the reverberation component from the extracted state sequence-section speech signal based on the dereverberation parameter $\delta_b$, input from the reverberation characteristic estimation unit 101 and the degree of reverberation influence $T_W$ input from the reverberation influence selection unit 106b and generates a second dereverberated speech signal.

The second dereverberation unit 107b calculates the frequency-domain coefficient of the second dereverberated speech signal based on the frequency-domain coefficient of the state sequence-section speech signal, the dereverberation parameter $\delta_b$, and the degree of reverberation influence $\tau_W$, for example, using Expression (14).

$$|e'(\omega,m,W)|^2 = |r(\omega,m,W)|^2 - \delta_b \tau_W |r(\omega,m,W)|^2 (|r(\omega,m,W)|^2 - \delta_b \tau_W |r(\omega,m,W)|^2 > 0)$$

$$|e(\omega,m,W)|^2 = \beta |r(\omega,m,W)|^2 \text{ (Otherwise)} \tag{14}$$

In Expression (14), e(ω, m, W) represents the frequency-domain coefficient in the m-th frame of the section in which a word group W is recognized by the first speech recognition unit 103 in the second dereverberated speech signal, that is, the section corresponding to the state sequence acquired by the state sequence acquisition unit 104b. r(ω, m, W) represents the frequency-domain coefficient in the m-th frame of the state sequence-section speech signal speech signal in the speech signal input from the sound source separation unit 14b. Accordingly, Expression (14) represents that the square value of the reverberation component weighted with the degree of reverberation influence $\tau_W$ is subtracted from the square value of the frequency-domain coefficient r(ω, m, W) of the state sequence-section speech signal in the frame thereof and the frequency-domain coefficient e(ω, m, W) of the second dereverberated speech signal of the frame is determined.

As described in the lower part of Expression (14), the term of $\beta r(\omega, m, W)|^2$ is provided to avoid occurrence of abnormal noise, similarly to Expression (4).

The second dereverberation unit 107b generates the second dereverberated speech signal, which is obtained by transforming the calculated frequency-domain coefficient e(ω, m, W) to the time domain, and outputs the generated second dereverberated speech signal to the second speech recognition unit 108.

The reverberation influence selection unit 106b may add the selected degree of reverberation influence $\tau_W$ to the state sequence information input from the state sequence acquisition unit 104b and may output the state sequence-section speech signal in the section corresponding to the state sequence to the second dereverberation unit 107b. In this case, the second dereverberation unit 107b removes the reverberation component from the state sequence-section speech signal input from the reverberation influence selection unit 106b based on the dereverberation parameter $\delta_b$, input from the reverberation characteristic estimation unit 101 and the degree of reverberation influence $\tau_W$ input from the reverberation influence selection unit 106b.

Generation of Data

The data generating process of generating (preliminarily learning) a variety of data used for the above-mentioned speech processing will be described below. The data generating process is performed off-line in advance by the data generation unit 150b. The data generation unit 150b may be incorporated into the speech processing device 11b and may be disposed independently of the speech processing device 11b. The data generation unit 150b may not be embodied by dedicated hardware, and may be embodied, for example, by causing a computer to execute a predetermined program.

The data generation unit 150b includes a storage medium storing a variety of data such as a speech database, a first acoustic model, a second acoustic model, and a language model and a control unit performing other processing. The control unit is, for example, a central processing unit (CPU). The control unit performs processes to be described later by executing a predetermined program.

In the speech database, a plurality of clean speech signals having a word group including N predetermined words as a learning speech signal as speech details are stored in correlation with the speech details.

The first acoustic model and the second acoustic model are a statistic model used to estimate phonemes from a sound feature amount for each frame, for example, HMMs.

The first acoustic model and the second acoustic model are statistic models providing the sound feature amount and the state, respectively, for example, additionally correspondence to the phonemes. The first acoustic model is constructed to include a GMM for each state. As described above, the GMM is defined by statistics such as a mixed weighting coefficient, an average value, and a covariance matrix and is used to calculate the likelihood for each state with respect to a certain sound feature amount. The state sequence is a time series of uttered phoneme states, the state indicates a stress such as intensity of a sound such as ascending, standing, and falling of a predetermined phoneme, or a tone such as a pitch of a sound, but does not have to be correlated uniquely. The states are modeled by statistic models and the phonemes are modeled by statistic models which are formed by coupling the statistic models of the states by state changes. For example, when the statistic models of the states are expressed by the GMM, the statistic models of the phonemes are expressed by HMMs in which the GMMs are coupled to each other.

The language model is a statistic model, for example, an HMM, used to recognize a word group from a phoneme sequence which is the time series of phonemes. The language model includes a conditional probability $P(w_i|w_{i-N+1}, w_i|_{i-N+2}, \ldots, w_{i-1})$ (n-gram) that gives an appearance probability of a subsequent word wi, for example, when N−1 preceding words $w_{i-N+1}, \ldots, w_{i-1}$ are given. The appearance probability P(W) of a word group including N words can be calculated by multiplying $P(w_i|w_{i-N+1}, w_i|_{i-N+2}, \ldots, w_{i-1})$ from i=1 to i=N. In the third embodiment, the language model may be determined in advance.

In the third embodiment, the data generation unit 150b realigns the correspondence between the sound feature amount and the state by updating the first acoustic model λ so that the likelihood of the state sequence as the time series of the uttered phoneme states. In the preliminary learning, the first acoustic model λ is generated for each reverberated speech and each clean speech, and the first acoustic model λ generated for each reverberated speech is used by the first speech recognition unit 103 (FIG. 13). The data generation unit 150b calculates the degree of reverberation influence $\tau_W$ indicating the degree of influence of the reverberation based on the preceding utterance to the currently-uttered speech for each state sequence, and generates the reverberation influence data in which the state sequence information and the degree of reverberation influence $\tau_W$ are correlated with each other.

The data generating process of generating the first acoustic model λ and the reverberation influence data will be described below.

FIG. 14 is a flowchart showing the data generating process.

Before starting the process flow shown in FIG. 14, the initial value of the first acoustic model λ is stored in the data generation unit 150b.

(Step S201) The data generation unit 150b searches for optimal state sequences $s'_{W_c}$ and $s'_{W_r}$ for the clean speech signal and the reverberant speech signal having a predetermined word group W as speech details. The reverberant speech signal may be generated by a reverberation unit 1502b (FIG. 15, which will be described later). Here, the data generation unit 150b calculates sound feature amount sequences $f^{(c)}$ and $f^{(r)}$ including a sound feature amount sequence for each frame of the clean speech signal and the reverberant speech signal. The data generation unit 150b calculates the likelihood for each state sequence candidate with reference to the first acoustic model λ for each of the calculated sound feature amount sequences $f^{(c)}$ and $f^{(r)}$. The data generation unit 150b selects the state sequences of which the calculated likelihood is the highest as the optimal state sequences $s'_{W_c}$ and $s'_{W_r}$ for example, using Expressions (15) and (16).

$$s'_{W_c} = \arg\max_{s \in S_{W_c}} \sum_j \log(P(s_j|s_{j-1}, f^{(c)})) \quad (15)$$

$$s'_{W_r} = \arg\max_{s \in S_{W_r}} \sum_j \log(P(s_j|s_{j-1}, f^{(r)})) \quad (16)$$

In Expressions (15) and (16), $\arg\max_{s \in S_{W_c}} \ldots$ represents the state sequence in which … is the maximum. $S_{W_c}$ and $S_{W_r}$ represent a set of state sequences that can be acquired using the HMM supporting the n-gram associated with the word group W for the clean speech signal and the reverberant speech signal. $P(s_j|s_{j-1}, f^{(c)})$, $P(s_j|s_{j-1}, f^{(r)})$ represents the appearance probability in which the j-th state $s_j$ appears subsequently to the (j−1)-th state $S_{j-1}$ in the state sequence when the sound feature amount sequences $f^{(c)}$ and $f^{(r)}$ are given. Thereafter, the process flow goes to step S202.

(Step S202) The data generation unit 150b updates the first acoustic model λ so as to increase the likelihood for each of the clean speech signal and the reverberant speech signal. In the updating, the parameters such as the mixed weighting coefficient, the average value, and the covariance matrix of the first acoustic model λ are adjusted. By satisfactorily increasing the likelihood, the sound feature amount and the state are correlated with each other. Thereafter, the process flow goes to step S203.

(Step S203) The data generation unit 150b determines whether the increase of the likelihood converges for each of the clean speech signal and the reverberant speech signal. Depending on whether the increase of the likelihood is less than, for example, a predetermined increase threshold value, it is determined whether the increase of the likelihood converges.

When it is determined that the increase of the likelihood converges (YES in step S203), the process flow goes to step S204. When it is determined that the increase of the likelihood does not converge (NO in step S203), the process flow returns to step S201.

(Step S204) The data generation unit 150b calculates the degree of reverberation influence $\tau_W$, for example, using Expression (17) based on the sound feature amount sequences $f^{(c)}$ and $f^{(r)}$ acquired for each word group W.

$$\tau_W = \frac{1}{O} \sum_{o=1}^{O} \frac{pow(f^{(r)}_{s'_{W_r}})^o - pow(f^{(c)}_{s'_{W_c}})^o}{pow(f^{(c)}_{s'_{W_c}})^o} \quad (17)$$

In Expression (17), O represents the number of frames in the sound feature amount sequences $f^{(c)}$ and $f^{(r)}$, and o represents the frame number. pow( … ) represents the power derived from …. That is, Expression (17) represents that the average value of the ratio of the power of a reverberation with respect to the power of a speech among the frames is calculated as the degree of reverberation influence $\tau_W$. When the same word group appears multiple times, the data generation unit 150b employs the average value of the degree of reverberation influence $\tau_W$ for every time. The data generation unit 150b generates the reverberation influence data by correlating the state sequence information indicating the reverberant speech state sequence $s'_{W_c}$ and the calculated degree of reverberation influence $\tau_W$ with each other. Thereafter, the process flow goes to step S205.

(Step S205) The data generation unit 150b classifies the state sequences $s'_{W_r}$ of the word groups to which a predetermined number of (for example, N−1) preceding words out of N words constituting the word groups are common as respective single word group in the generated reverberation influence data.

The data generation unit 150b employs one state sequence s'$_{Wr}$ belonging to each word group and the degree of reverberation influence τ$_W$ correlated therewith and discards the other state sequences s'$_{Wr}$ and the other degree of reverberation influence τ$_W$. Accordingly, the reverberation influence data is generated in which the state sequence information and the degree of reverberation influence τ$_W$ are correlated with each other for each word group. As a result, it is possible to suppress bloating of the reverberation influence data. Since the amount of reference data for a state sequence s'$_{Wr}$ having a small number of frames or a word group having a low appearance frequency is small, it is possible to avoid a decrease in reliability of the degree of reverberation influence τ$_W$. The data generation unit 150b may classify the state sequences s'$_{Wr}$ of the word groups to which a predetermined number of preceding words are common and which include one or more common phonemes in a subsequent word (for example, the final word of N words) as a single word group. As a set of subsequent words including one or more common phonemes, for example, a set including "here" and "hear" in English is employed but a set including "fly" and "hello" is not employed. The data generation unit 150b may employ the average value of the degree of reverberation influence τ$_W$ belonging to each word group as the degree of reverberation influence τ$_W$. Thereafter, the process flow shown in FIG. 14 ends.

The acoustic model creating process of creating the first acoustic model and the second acoustic model will be described below.

FIG. 15 is a block diagram showing the acoustic model creating process.

By executing a predetermined program, the data generation unit 150b serves as a speech signal acquisition unit 1501b, a reverberation unit 1502b, a reverberant speech data storage unit 1503b, a first acoustic model creating unit 1504b, a first acoustic model storage unit 1505b, a speech recognition unit 1506b, a state sequence acquisition unit 1507b, a reverberation influence storage unit 1508b, a reverberation influence selection unit 1509b, a dereverberation unit 1510b, a second acoustic model creating unit 1511b, and a second acoustic model storage unit 1512b.

The speech signal acquisition unit 1501b acquires individual clean speech signals from a speech database and outputs the acquired clean speech signals to the reverberation unit 1502b.

The reverberation unit 1502b convolutes the clean speech signals input from the speech signal acquisition unit 1501b with a room transfer function (RTF) to generate reverberant speech signals. The room transfer function may be measured in the room at that point of time or may be calculated using a predetermined model, for example, may be calculated depending on the distance r from a sound source. The reverberation unit 1502b stores the generated reverberant speech signals in the reverberant speech data storage unit 1503b in correlation with the speech details.

The first acoustic model creating unit 1504b generates the optimal first acoustic model based on the reverberant speech signals read from the reverberant speech data storage unit 1503b and the speech details. The process of creating the first acoustic model corresponds to the processes of steps S201 to S203 (FIG. 14) in the above-mentioned data generating process. The first acoustic model creating unit 1504b stores the generated first acoustic model in the first acoustic model storage unit 1505b.

The speech recognition unit 1506b performs a speech recognizing process on the reverberant speech signals read from the reverberant speech data storage unit 1503b using the first acoustic model stored in the first acoustic model storage unit 1505b and the above-mentioned language model. The speech recognition unit 1506b outputs the state sequence information indicating the state sequence, which is generated through the speech recognizing process similarly to the first speech recognition unit 103 (FIG. 13), in the state sequence acquisition unit 1507b.

The state sequence acquisition unit 1507b outputs the state sequence information input from the speech recognition unit 1506b to the reverberation influence selection unit 1509b, similarly to the state sequence acquisition unit 104b (FIG. 13).

The reverberation influence storage unit 1508b stores reverberation influence data generated in step S204 or step S205 (FIG. 14) in the above-mentioned data generating process in advance.

The reverberation influence selection unit 1509b performs the same process as the reverberation influence selection unit 106b (FIG. 13) and selects the degree of reverberation influence τ$_W$ corresponding to the state sequence information input from the state sequence acquisition unit 1507b from the reverberation influence storage unit 1508b. The reverberation influence selection unit 1509b outputs the selected degree of reverberation influence τ$_W$ to the dereverberation unit 1510b.

The dereverberation unit 1510b extracts the speech signal of the section corresponding to the state sequence acquired by the state sequence acquisition unit 1507b out of the reverberant speech signals read from the reverberant speech data storage unit 1503b as the state sequence-section speech signal. The dereverberation unit 1510b performs the same process as the second dereverberation unit 107b (FIG. 13) and removes the reverberation component from the extracted state sequence-section speech signal based on the dereverberation parameter δ$_b$, and the degree of reverberation influence τ$_W$ input from the reverberation influence selection unit 1509b to generate a dereverberated speech signal. The dereverberation parameter δ$_b$, used in the dereverberation unit 1510b can be determined based on the room transfer function used in the reverberation unit 1502b. The dereverberation unit 1510b outputs the generated dereverberated speech signal to the second acoustic model creating unit 1511b.

The second acoustic model creating unit 1511b generates the second acoustic model so as to be optimal based on the likelihood of the speech details, that is, to maximize the likelihood, based on the dereverberated speech signal input from the dereverberation unit 1510b and the speech details thereof. The second acoustic model creating unit 1511b stores the generated second acoustic model in the second acoustic model storage unit 1512b.

In this manner, the speech processing device (for example, the speech processing device 11b) according to the third embodiment includes a speech recognition unit (for example, the first speech recognition unit 103) that sequentially recognizes the states of utterance form an input speech. The speech processing device according to the third embodiment includes a reverberation influence storage unit (for example, the reverberation influence storage unit 105b) that stores the degree of reverberation influence indicating the influence of the reverberation based on a preceding speech to a subsequent speech subsequent to the preceding speech and a state sequence as a series of states in the preceding speech and the subsequent speech in correlation with each other. The speech processing device according to the third embodiment includes a reverberation influence selection unit (for example, the reverberation influence selection unit 106b) that selects the degree of reverberation influence corresponding to the state sequence most approximate to the state sequence including the states of utterance recognized by the speech recognition unit (for example, the first speech recognition unit 103) from the reverberation influence storage unit. The speech processing device according to the third embodiment includes a reverberation reduction unit (for example, the second dereverberation unit 107b) that removes the reverberation component weighted with the selected degree of reverberation influence from the speech from which the state sequence is recognized by the speech recognition unit (for example, the first speech recognition unit 103).

According to this configuration, since the reverberation reduction is carried out in consideration of the reverberation influence differing between the states of utterance, it is possible to improve the speech recognition accuracy in the speech recognizing process that is performed on the speech recorded in reverberations, for example, by the second speech recognition unit 108.

Since the degree of reverberation influence is a ratio of the power of a reverberation based on a speech from which a predetermined state sequence is recognized with respect to the power of the speech, the reverberation reduction is carried out in consideration of the influence of the power of the reverberation differing between a plurality of neighboring state sequences. Accordingly, it is possible to improve the speech recognition accuracy in the speech recognizing process that is performed on the speech recorded in reverberations, for example, by the second speech recognition unit 108.

The speech recognition unit recognizes the states of utterance with reference to the acoustic model created so as to increase the likelihood of the state sequence recognized from the speech from which a predetermined word group is uttered. Since the sound feature amount indicating physical features of a speech in an acoustic model is correlated with the state of utterance, the variation in the physical characteristics of a speech can be expressed using the state sequences. Accordingly, since the reverberation reduction is carried out in consideration of the influence of the power of a reverberation differing depending on the variation in the physical characteristics based on the states of utterance, it is possible to improve the speech recognition accuracy in the speech recognizing process that is performed on the speech recorded in reverberations, for example, by the second speech recognition unit 108.

In the third embodiment, the recognition segment used to select the degree of reverberation influence is a recognition segment which is more finely segmented than phonemes forming a word. Accordingly, since the reverberation reduction is carried out in consideration of the influence of a reverberation differing depending on the difference and the variation of the utterance speed, it is possible to further improve the speech recognition accuracy, compared with a case where the recognition segment is a word or a phoneme.

Test Result

A test result in which the speech recognition accuracy was verified using the speech processing device 11b will be described below.

In test rooms A (RT=240 ms) and B (RT=640 ms), the process flows shown in FIGS. 14 and 15 were performed and the first acoustic model, the second acoustic model, and the reverberation influence data were generated in advance. The first acoustic model and the second acoustic model were subjected to learning in advance using the above-mentioned database of the Wall Street Journal as learning data.

In the test, a continuous speech recognizing process was performed using 3000 words and the speech recognition rate was observed. The first acoustic model and the second acoustic model used in the speech processing device 11b were HMM of three states for each phoneme and the language model was an HMM corresponding to the n-gram. A microphone array of 16 channels was used as the sound collection unit 12b, and the reverberant speech signals recorded by the sound collection unit 12b in test rooms A and B were used as the test data. At the time of recording the test data, each speaker was made to utter a word 20 times at a position separated from the sound collection unit 12b.

The number of speakers was 20 and three distances of 1.0 m, 2.0 m, and 3.0 m were used as the distance from the sound collection unit 12b to the speakers. The speakers did not participate in the data generating process.

In the test, the test data was processed using the following eight methods and the speech recognition rate was observed using the processed data.

Method A: Not processed (no processing)

Method B: Enhancement based on wavelet extreme clustering

Method C: Enhancement based on linear prediction (LP) residual

Method D: Reverberation reduction based on the spectral subtraction of the related art (Previous Work Compensating only the Waveform)

Method E: Method of using the room transfer function estimated in the third embodiment and not performing grouping (step S205 of FIG. 14) in generating the reverberation influence data (Proposed Method (Estimated RTF))

Method F: Method of using the room transfer function estimated in the third embodiment and not performing grouping (step S205 of FIG. 14) in generating the reverberation influence data (Proposed Method (Matched RTF))

Method G: Method of using the room transfer function estimated in the third embodiment and performing grouping (step S205 of FIG. 14) in generating the reverberation influence data (Proposed Method with N-gram Grouping in S205 (Estimated RTF))

Method H: Method of using the room transfer function estimated in the third embodiment and performing grouping (step S205 of FIG. 14) in generating the reverberation influence data (Proposed Method with N-gram Grouping in S205 (Matched RTF)

Examples of Speech Recognition Rate

FIGS. 16A to 17C are diagrams showing an example of the speech recognition rate for each processing method.

FIGS. 16A to 17C show the speech recognition rates acquired in test rooms A and B. Three distances of 1.0 m, 2.0 m, and 3.0 m are used as distance D, and the speech recognition rates obtained in the respective cases are shown in FIGS. 16A and 17A, FIGS. 16B and 17B, and FIGS. 16C and 17C. In FIGS. 16A to 17C, the vertical axis and the horizontal axis represent the speech recognition rate (with a unit of %) and the method (Methods A to H), respectively.

Out of test rooms A and B, the speech recognition rate was lower in test room B having the longer reverberation time. In the same test room, the larger the distance D became, the lower the speech recognition rate became. This means that the more the reverberation component included in the recorded speech signal becomes, the lower the speech recognition rate becomes. The speech recognition rate increases in the order of Methods A, B, C, E, D, F, G, and H. For example, in the case of test room A (RT=240 ms) and the distance of D=1.0 m (FIG. 16A), 84.3% to 86.4% in Methods E to H of the third embodiment was significantly higher than 79.0% to 83.2% in Methods A to D of the related art. In the case of test room B (RT=640 ms) and the distance of D=3.0 m (FIG. 17C), 40.1% to 46.1% in Methods E to H of the third embodiment was significantly higher than 15.8% to 36.5% in Methods A to D of the related art. These results mean that the speech recognition rate is improved in comparison with the related art by weighting the late reflection component with the degree of reverberation influence selected based on the recognized state sequences and performing the reverberation reducing process.

In Methods E and F and Methods G and H of the third embodiment, the speech recognition rate was significantly higher in Methods G and H than in Methods E and F. For example, in the case of test room A (RT=240 ms) and the distance of D=1.0 m (FIG. 16A), the speech recognition rates in Methods G and H were 86.0% and 86.4%, and the speech recognition rates in Methods E and F were 84.3% and 84.5%. In the case of test room B (RT=640 ms) and the distance of D=3.0 m (FIG. 17C), the speech recognition rates in Methods G and H were 45.3% and 46.1%, and the speech recognition rates in Methods E and F were 40.0% and 40.8%. These results mean that since the number of samples of the state sequences per group increases by grouping the word groups of which the preceding word causing a reverberation is common, the sound features are not damaged in spite of different subsequent words and that the accuracy can be improved and the speech recognition rate can be improved by using the common degree of reverberation influence.

In the above-mentioned embodiments, the example where a word group is a word pair including two neighboring words is described above; however, the present invention is not limited to this example. The word group may be a word group including three or more neighboring words. In this case, the degree of reverberation influence includes multiple coefficients and each coefficient may be a coefficient indicating the influence of a reverberation based on a speech of each word included in a word group to the speech of a word subsequent to the word.

The second dereverberation unit 107 (FIG. 1) removes the reverberation component weighted with coefficients corresponding to the speeches of the subsequent words from the speeches of the respective words of the corresponding word group.

A word is used as the recognition segment in the first embodiment and the second embodiment and a state of utterance is used as the recognition segment in the third embodiment; however, the present invention is not limited to these examples.

The speech processing devices 11, 11a, and 11b may use another recognition segment such as a phoneme instead of the word or the state of utterance.

In the first embodiment and the second embodiment, a speech signal of one channel is mainly input to the speech processing devices 11 and 11a from the sound collection unit 12; however, the present invention is not limited to this configuration. The speech processing systems 1 and 1a may include a sound source separation unit 14b (FIG. 13) and a speech signal may be input to the speech processing devices 11 and 11a from the sound source separation unit 14b instead of the sound collection unit 12.

The sound source separation unit 14b may use a method such as an adaptive beam forming method other than the GHDSS method as the sound source separating process. The adaptive beam forming method is a method of estimating a sound source direction and controlling directivity so that the sensitivity is the highest in the estimated sound source direction.

In the speech processing system 1b (FIG. 13), use of the sound source separation unit 14b may be skipped, and a speech signal may be input to the speech processing device 11b from the sound collection unit 12b, In the speech processing devices 11, 11a, and 11b, use of the first dereverberation unit 102 may be skipped and a speech signal may be input directly to the first speech recognition unit 103 from the sound collection unit 12 (r the sound collection unit 12b).

In the speech processing devices 11, 11a, and 11b, use of the second speech recognition unit 108 and the second dereverberated speech signal may be output from the second dereverberation unit 107 to the outside of the speech processing devices 11, 11a, and 11b. Accordingly, the output second dereverberated speech signal may be supplied to a speech recognition unit located outside the speech processing devices 11, 11a, and 11b.

The data generation unit 150b may skip the grouping process (step S205 of FIG. 14).

A part of the speech processing devices 11, 11a, and 11b according to the first, second, and third embodiments and the modification example, for example, the reverberation characteristic estimation unit 101, the first dereverberation unit 102, the first speech recognition unit 103, the word extraction unit 104, the state sequence acquisition unit 104b, the reverberation influence selection unit 106 and 106b, the second dereverberation units 107 and 107b, the second speech recognition unit 108, and the dialogue control unit 120a, may be embodied by a computer. In this case, the parts of the speech processing devices may be embodied by recording a program for performing the control functions on a computer-readable recording medium and reading and executing the program recorded on the recording medium into a computer system. Here, the "computer system" is a computer system incorporated into the speech processing devices 11, 11a, and 11b and is assumed to include an OS or hardware such as peripherals. Examples of the "computer-readable recording medium" include storage devices such as portable mediums such as a flexible disk, a magneto-optical disk, a ROM, and a CD-ROM and a hard disk incorporated into a computer system. The "computer-readable recording medium" may include a medium that dynamically holds a program for a short time like a communication line when a program is transmitted via a network such as the Internet or a communication circuit such as a telephone circuit or a medium that holds a program for a predetermined time like a volatile memory in a computer system serving as a server or a client in that case. The program may be configured to realize a part of the above-mentioned functions or may be configured to realize the above-mentioned functions by combination with a program recorded in advance in a computer system.

All or a part of the speech processing devices 11, 11a, and 11b according to the first, second, and third embodiments and the modification example may be embodied by an integrated circuit such as a large scale integration (LSI) circuit. The functional blocks of the speech processing devices 11, 11a, and 11b may be individually incorporated into processors, or a part or all thereof may be integrated and incorporated into a processor. The integration circuit technique is not limited to the LSI, and may be embodied by a dedicated circuit or a general-purpose processor. When an integration circuit technique appears as a substituent of the LSI with advancement in semiconductor technology, an integrated circuit based on the technique may be used.

While various embodiments of the invention have been described in detail with reference to the drawings, the specific configurations are not limited to the above-mentioned configurations and can be modified in design in various forms without departing from the gist of the invention.

What is claimed is:

1. A speech processing device comprising:
a speech recognition unit configured to sequentially recognize words from an input speech;
a reverberation influence storage unit configured to store a word pair, which includes a preceding word and a subsequent word subsequent to the preceding word, and a degree of reverberation influence, which indicates a degree of an influence where a reverberation based on the preceding word influences the subsequent word in the word pair, in correlation with each other;
a reverberation influence selection unit configured to select the degree of reverberation influence corresponding to the word pair which includes the words sequentially recognized by the speech recognition unit from the reverberation influence storage unit; and
a reverberation reduction unit configured to remove a reverberation component weighted with the degree of reverberation influence from the speech from which at least a part of the words of the word pair is recognized.

2. The speech processing device according to claim 1, wherein the reverberation reduction unit is configured to calculate a first reverberation component by multiplying the speech from which the at least a part of the words is recognized by a dereverberation parameter indicating a contribution of a reverberation component, to calculate a second reverberation component by weighting the first reverberation component with the degree of reverberation influence, and to remove the second reverberation component from the speech from which the at least a part of the words is recognized.

3. The speech processing device according to claim 1, wherein the degree of reverberation influence is a ratio of a power spectral density of a reverberation component based on the speech of the subsequent word with respect to a power spectral density of the speech of the one word,
wherein the reverberation influence storage unit is configured to store the degree of reverberation influence and the power spectral density of a speech based on a word pair including the one word and the subsequent word in correlation with each other, and
wherein the reverberation influence selection unit is configured to select the degree of reverberation influence corresponding to the power spectral density most approximate to the power spectral density of the input speech for each word pair from the words recognized by the speech recognition unit.

4. The speech processing device according to claim 1, wherein the word is a state of utterance including a plurality of neighboring words wherein the word pair is a state sequence including a plurality of neighboring states of utterances, and
wherein the degree of reverberation influence is a ratio of the power of a reverberation based on a speech from which a predetermined state sequence is recognized with respect to power of the speech.

5. The speech processing device according to claim 4, wherein the speech recognition unit is configured to recognize the states of utterance with reference to an acoustic model which is created so that a likelihood of a state sequence recognized from a speech from which a predetermined word group is uttered increases.

6. A speech processing method comprising:
a speech recognizing step of sequentially recognizing words from an input speech;
a reverberation influence selecting step of selecting a degree of reverberation influence corresponding to a word pair, which includes the words sequentially recognized in the speech recognizing step, from a reverberation influence storage unit configured to store the word pair, which includes a preceding word and a subsequent word subsequent to the preceding word, and the degree of reverberation influence, which indicates a degree of an influence where a reverberation based on the preceding word influences the subsequent word in the word pair, in correlation with each other; and
a reverberation reducing step of removing a reverberation component weighted with the degree of reverberation influence from the speech from which at least a part of words of the word pair is recognized.

7. A non-transitory computer-readable storage medium comprising a speech processing program causing a computer of a speech processing device to perform:
a speech recognizing procedure of sequentially recognizing words from an input speech;
a reverberation influence selecting procedure of selecting a degree of reverberation influence corresponding to a word pair, which includes the words sequentially recognized in the speech recognizing procedure, from a reverberation influence storage unit configured to store the word pair, which includes a preceding word and a subsequent word subsequent to the preceding word, and the degree of reverberation influence, which indicates a degree of an influence where a reverberation based on the preceding word influences the subsequent word in the word pair, in correlation with each other; and
a reverberation reducing procedure of removing a reverberation component weighted with the degree of reverberation influence from the speech from which at least a part of words of the word pair is recognized.

* * * * *